United States Patent
Wakeford et al.

(10) Patent No.: US 11,093,742 B1
(45) Date of Patent: Aug. 17, 2021

(54) OCULAR IMAGING SYSTEM

(71) Applicant: Optos Plc, Dunfermline (GB)

(72) Inventors: Peter Robert Wakeford, Dunfermline (GB); Enrico Pellegrini, Dunfermline (GB)

(73) Assignee: OPTOS PLC, Dunfermline (GB)

( * ) Notice: Subject to any disclaimer, the term of this patent is extended or adjusted under 35 U.S.C. 154(b) by 0 days.

(21) Appl. No.: 15/931,832

(22) Filed: May 14, 2020

(51) Int. Cl.
*G06K 9/00* (2006.01)
*G06T 7/73* (2017.01)

(52) U.S. Cl.
CPC ....... *G06K 9/0061* (2013.01); *G06K 9/00604* (2013.01); *G06K 9/00617* (2013.01); *G06T 7/73* (2017.01); *G06T 2207/20081* (2013.01); *G06T 2207/30041* (2013.01)

(58) Field of Classification Search
None
See application file for complete search history.

(56) References Cited

U.S. PATENT DOCUMENTS

2020/0027209 A1* 1/2020 Madabhushi ............. G06T 5/50
2020/0250497 A1* 8/2020 Peng .................... G06K 9/6277

OTHER PUBLICATIONS

International Search Report and Written Opinion of the International Searching Authority dated Jan. 29, 2021 in International Application No. PCT/EP2020/063471.

Ngan Meng Tan et al, "Classification of Left and Right Eye Retinal Images", Proceedings of SPIE, vol. 7624, SPIE Medical Imaging, pp. 762438 to 762438-8, Mar. 4, 2010.

Xiayu Xu, "Simultaneous automatic detection of optic disc and fovea", University of Iowa, Iowa Research Online, Theses and Dissertations, Spring 2010, MS (Master of Science) thesis, University of Iowa, 2010 (76 sheets) pp. title page to 63, 2010 (available at https://ir.uiowa.edu/etd/630).

Meyer Maria Ines et al, "A Pixel-Wise Distance Regression Approach for Joint Retinal Optical Disc and Fovea Detection", Advances in Databases and Information Systems; Springer Nature Switzerland AG 2018, MICCAI 2018, LNCS 11071, pp. 39-47, 2018 (https://doi.org/10.1007/978-3-030-00934-2_5).

\* cited by examiner

*Primary Examiner* — Edward Park
(74) *Attorney, Agent, or Firm* — DeLucia, Mlynar & Alicandro LLP

(57) ABSTRACT

An ocular imaging system comprising: an image acquisition module which acquires a retinal image; a landmark location prediction module which predicts locations of at least two landmarks in the retinal image; and an apparatus for alerting a user to an unreliability in at least one of the predicted locations. The apparatus receives the predicted first locations; uses the predicted locations to evaluate a distance metric indicative of a distance between the landmark features; use data indicative of a probability distribution of a distance between the landmark features obtained from measurements of the distance in retinal images different from the retinal image to determine an indication of whether the evaluated distance metric lies outside a predetermined interval about a peak the probability distribution; and generates an alert indicating the unreliability when the determined indication indicates that the evaluated distance metric lies outside the predetermined interval.

17 Claims, 15 Drawing Sheets

OCULAR IMAGING SYSTEM

TECHNICAL FIELD

Example aspects herein generally relate to the field of ocular imaging systems and, more particularly, to ocular imaging systems for imaging a retina of an eye.

BACKGROUND

A variety of ocular imaging systems, such as scanning laser ophthalmoscopes and fundus cameras, are commonly used to acquire images of the retina of a subject's eye. The acquired retinal images may be inspected by an ophthalmologist or other medical professional to assess the health of the retina. The acquired retinal images may also be processed automatically by image processing software for a variety of purposes. For example, machine learning algorithms, such as convolutional neural networks (CNN), can be used to carry out ocular image classification (for example, to classify an image as belonging to a first class comprising images of a left eye, or to a second class comprising images of a right eye), using locations of retinal landmarks (e.g. optic disc or fovea) that have been predicted by the machine learning algorithm on the basis of the information in the retinal image. Such machine learning algorithms are typically trained on a dataset of ocular images and then used to perform predictions on new images.

SUMMARY

Machine learning algorithms typically need to be trained on many retinal images to achieve an acceptable level of accuracy. Even where large training datasets are used, 100% accuracy is rarely possible. For example, when a significant portion of a retinal image is occluded (e.g. due to a blinking event or imaging artefacts such as eyelashes occurring during imaging, or due to the presence of cataracts in the eye being imaged), the machine learning algorithm(s) may fail to make an accurate prediction for the location of the landmark feature(s). This failure, which will typically go unnoticed, may adversely affect the performance of (and therefore the user's trust in) downstream data processing operations that are reliant on accurate landmark feature location(s), such as auto-laterality routines for determining whether a retinal image is of a right eye or left eye, disease pipelines for automatic diagnosis of various ocular diseases or disorders, and data processing operations for automatically annotating retinal images (among others).

In view of the above, the present inventors have devised an ocular imaging system which can alert a user thereof to an unreliability in one or more predicted landmark feature locations in a retinal image. An ocular imaging system described herein determines a distance between the predicted locations of a first landmark feature and a second landmark feature in the retinal image, and further determines whether the distance is within an acceptable range based on a comparison of the distance with a distribution of the distance that is derived from a ground-truth dataset of retinal images. Where the determined distance between the predicted locations of the landmark features falls outside a predetermined interval of the distribution, an alert may be generated to indicate that one or both of the predicted locations (and therefore any subsequent classification process there may be) are unreliable, so that the user may, for example, determine the landmark locations by other means (e.g. by inspection of the retinal image) or take other appropriate action.

More specifically, the present inventors have devised, in accordance with a first example aspect herein, an ocular imaging system for acquiring a retinal image of at least a portion of a retina of an eye, comprising: an image acquisition module configured to acquire the retinal image; a landmark location prediction module configured to use a machine learning algorithm to predict, as predicted locations of landmark features in the retinal image, a first location of a first landmark feature in the retinal image and a second location of a second landmark feature in the retinal image; and an apparatus for alerting a user of the ocular imaging system to an unreliability in at least one of the predicted locations of the landmark features. The apparatus comprises: a receiver module configured to receive the predicted locations of the landmark features; a distance metric evaluation module configured to use the predicted locations of the landmark features to evaluate a distance metric which is indicative of a distance between the first landmark feature and the second landmark feature; an outlier detector module configured to determine, using data indicative of a probability distribution of a distance between the first landmark feature and the second landmark feature obtained from measurements of the distance in a set of retinal images different from the retinal image, an indication of whether the evaluated distance metric lies outside a predetermined interval of the probability distribution which includes a peak of the probability distribution; and an alert generator module configured to generate an alert indicating that at least one of the predicted locations of the landmark features in the retinal image is unreliable in a case where the determined indication indicates that the evaluated distance metric lies outside the predetermined interval of the probability distribution.

The present inventors have devised, in accordance with a second example aspect herein, an apparatus for processing, as predicted locations of landmark features in a retinal image of at least a portion of a retina of an eye, a first location of a first landmark feature in the retinal image and a second location of a second landmark feature in the retinal image that have been predicted by a machine learning algorithm, to alert a user of the apparatus to an unreliability in at least one of the predicted locations of the landmark features. The apparatus comprises: a receiver module configured to receive the predicted locations of the landmark features; a distance metric evaluation module configured to use the predicted locations of the landmark features to evaluate a distance metric which is indicative of a distance between the first landmark feature and the second landmark feature; an outlier detector module configured to determine, using data indicative of a probability distribution of a distance between the first landmark feature and the second landmark feature obtained from measurements of the distance in a set of retinal images different from the retinal image, an indication of whether the evaluated distance metric lies outside a predetermined interval of the probability distribution which includes a peak of the probability distribution; and an alert generator module configured to generate an alert indicating that at least one of the predicted locations of the landmark features in the retinal image is unreliable in a case where the determined indication indicates that the evaluated distance metric lies outside the predetermined interval of the probability distribution.

The present inventors have devised, in accordance with a third example aspect herein, a method of processing, as predicted locations of landmark features in a retinal image of at least a portion of a retina of an eye, a first location of a first landmark feature in the retinal image and a second location of a second landmark feature in the retinal image that have been predicted by a machine learning algorithm, to alert a user of the apparatus to an unreliability in at least one of the predicted locations of the landmark features. The method comprises: receiving the predicted locations of the landmark features; using the predicted locations of the landmark features to evaluate a distance metric which is indicative of a distance between the first landmark feature and the second landmark feature;

determining, using data indicative of a probability distribution of a distance between the first landmark feature and the second landmark feature obtained from measurements of the distance between the first landmark feature and the second landmark feature in retinal images different from the retinal image, an indication of whether the evaluated distance metric lies outside a predetermined interval of the probability distribution which includes a peak of the probability distribution; and generating an alert indicating that the at least one of the predicted locations of the landmark features in the retinal image is unreliable, in a case where the determined indication indicates that the evaluated distance metric lies outside the predetermined interval of the probability distribution.

The present inventors have devised, in accordance with a fourth example aspect herein, a computer program comprising computer-readable instructions which, when executed by a computer, cause the computer to execute the method according to the third example aspect set out above. The computer program may be stored on a non-transitory computer-readable storage medium, or carried by a computer-readable signal.

BRIEF DESCRIPTION OF THE DRAWINGS

Example embodiments will now be explained in detail, by way of non-limiting example only, with reference to the accompanying figures described below. Like reference numerals appearing in different ones of the figures can denote identical or functionally similar elements, unless indicated otherwise.

DETAILED DESCRIPTION OF EXAMPLE EMBODIMENTS

Machine learning algorithms typically need to be trained on many retinal images to achieve an acceptable level of accuracy. Even where large datasets are used, 100% accuracy is rarely possible. For example, when a significant portion of a retinal image is occluded (e.g. due to a blinking event or imaging artefacts such as eyelashes occurring during imaging, or due to the presence of cataracts in the eye being imaged), the machine learning algorithm may fail to make an accurate prediction for the location of the landmark feature(s). This failure, which will typically go unnoticed, may adversely affect the performance of (and therefore the user's trust in) downstream data processing operations that are reliant on accurate landmark feature location(s), such as auto-laterality routines for determining whether a retinal image is of a right eye or left eye, disease pipelines for automatic diagnosis of various ocular diseases or disorders, and data processing operations for automatically annotating retinal images (among others).

In view of the above, the present inventors have devised computer-implemented techniques and apparatus for alerting a user to an unreliability in the locations of one or more predicted landmark features in a retinal image that have been predicted by a machine learning algorithm. The user may then respond to the alert by determining the landmark locations by other means (e.g. by inspection of the retinal image), for example, or take other appropriate action.

Example embodiments of such apparatus and related computer-implemented techniques will now be described in more detail with reference to the accompanying drawings.

Figure 1:
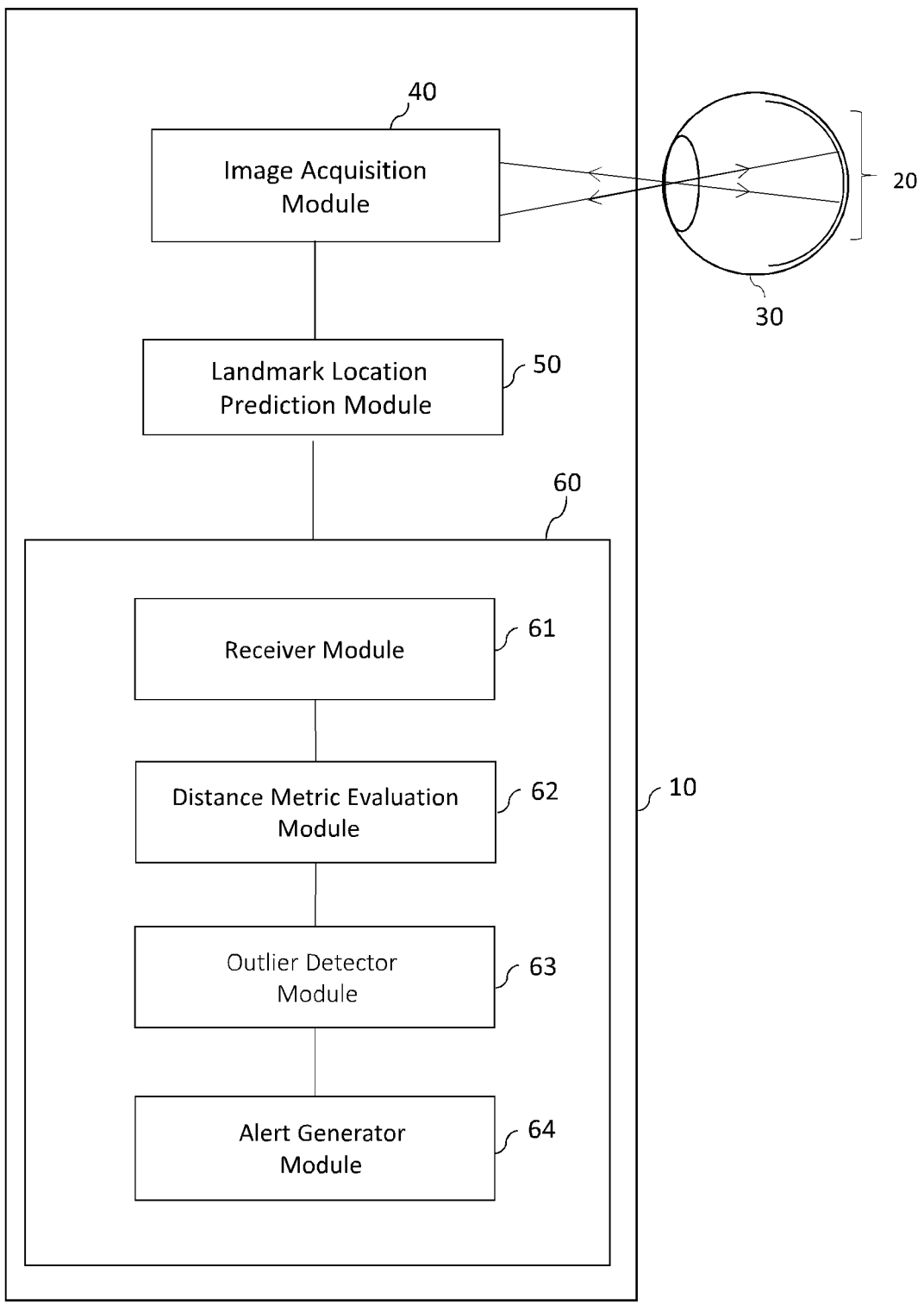
FIG. 1 is a schematic illustration of an ocular imaging system comprising an apparatus for alerting a user to an unreliability in at least one predicted location of a landmark feature in a retinal image according to a first example embodiment herein.

FIG. 1 is a schematic illustration of an ocular imaging system 10 according to a first example embodiment, which is configured to acquire a retinal image of at least a portion of a retina 20 of an eye 30 of a subject. The ocular imaging system 10 comprises an image acquisition module 40 which is configured to acquire the retinal image. The image acquisition module 40 may, as in the present example embodiment, take the form of a scanning laser ophthalmoscope (SLO) but may alternatively comprise a fundus camera or any other kind of image acquisition device capable of acquiring retinal data from the eye 30 that is known to those skilled in the art.

The ocular imaging system 10 further comprises a landmark location prediction module 50, which is configured to use at least one machine learning algorithm to predict, as predicted locations of landmark features in the retinal image, a first location, $L_1$, of a first landmark feature in the retinal image, and a second location, $L_2$, of a second landmark feature in the retinal image. The ocular imaging system 10 further comprises an apparatus 60, which is configured to alert a user of the ocular imaging system 10 to an unreliability in at least one of the predicted locations of the landmark features. As shown in FIG. 1, the apparatus 60 comprises a receiver module 61, a distance metric evaluation module 62, an outlier detector module 63, and an alert generator module 64. Example implementations of the apparatus 60 and the functionality of its illustrated component modules are described in more detail below.

Figure 2:
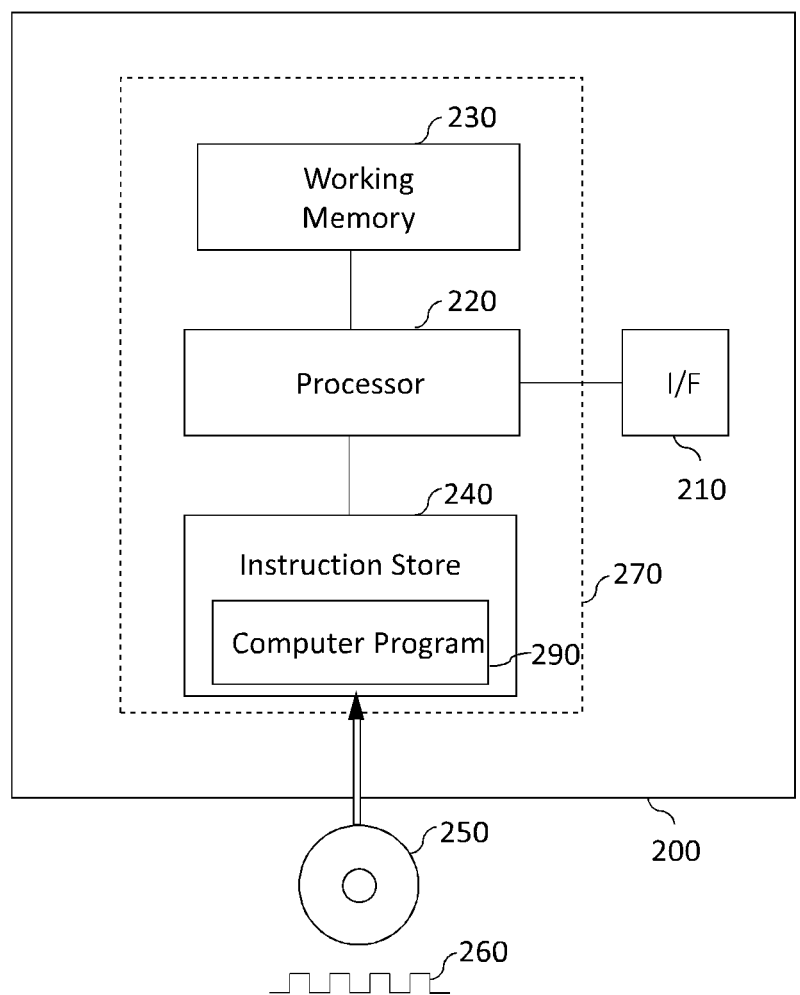
FIG. 2 is a block diagram illustrating an example implementation of the apparatus of the first example embodiment in programmable signal processing hardware.

FIG. 2 shows a signal processing apparatus 200 according to an example embodiment herein. In one example embodiment herein, the signal processing apparatus 200 can be included in and/or form (and be an example implementation of) one or more various components described herein, in programmable signal processing hardware. As but one example, the signal processing apparatus 200 can be included in and/or form (and be an example implementation of) the apparatus 60 in FIG. 1. The signal processing apparatus 200 comprises an interface module 210 for receiving the predicted locations of the landmark features in the retinal image from the landmark location prediction module 50, and outputting an alert to draw the user's attention to a determined unreliability of a predicted landmark location. The interface module 210 may further receive a user input from one or more peripheral devices (e.g. one or more of a keyboard, a touchpad or mouse), and output the alert to one or more output devices (e.g. a speaker and/or a computer monitor), which may form part of the ocular imaging system 10 of the present example embodiment, or the ocular imaging system 1000 of the second example embodiment described below. The signal processing apparatus 200 further comprises a processor (CPU) 220, a working memory 230 (e.g. a random-access memory) and an instruction store 240 storing a computer program comprising computer-readable instructions which, when executed by the processor 220 (in the case where the apparatus 200 forms the apparatus 60), cause the processor 220 to perform the processing operations of the apparatus 60. The instruction store 240 may comprise a ROM (e.g. in the form of an electrically-erasable programmable read-only memory (EEPROM) or flash memory) which is pre-loaded with the computer-readable instructions. Alternatively, the instruction store 240 may comprise a RAM or similar type of memory, and the computer-readable instructions can be input thereto from a computer program product, such as a computer-readable storage medium 250 such as a CD-ROM, etc. or a computer-readable signal 260 carrying the computer-readable instructions.

In the present example embodiment, a combination 270 of the hardware components shown in FIG. 1, comprising the processor 220, the working memory 230 and the instruction store 240, is configured to perform functions of the receiver module 61, the distance metric evaluation module 62, the outlier detector module 63, and the alert generator module 64 that are described below. Furthermore, in one example embodiment herein, the landmark location prediction module 50 of FIG. 1 can include and/or be formed/implemented by the signal processing hardware 200 of FIG. 2.

Figure 3:
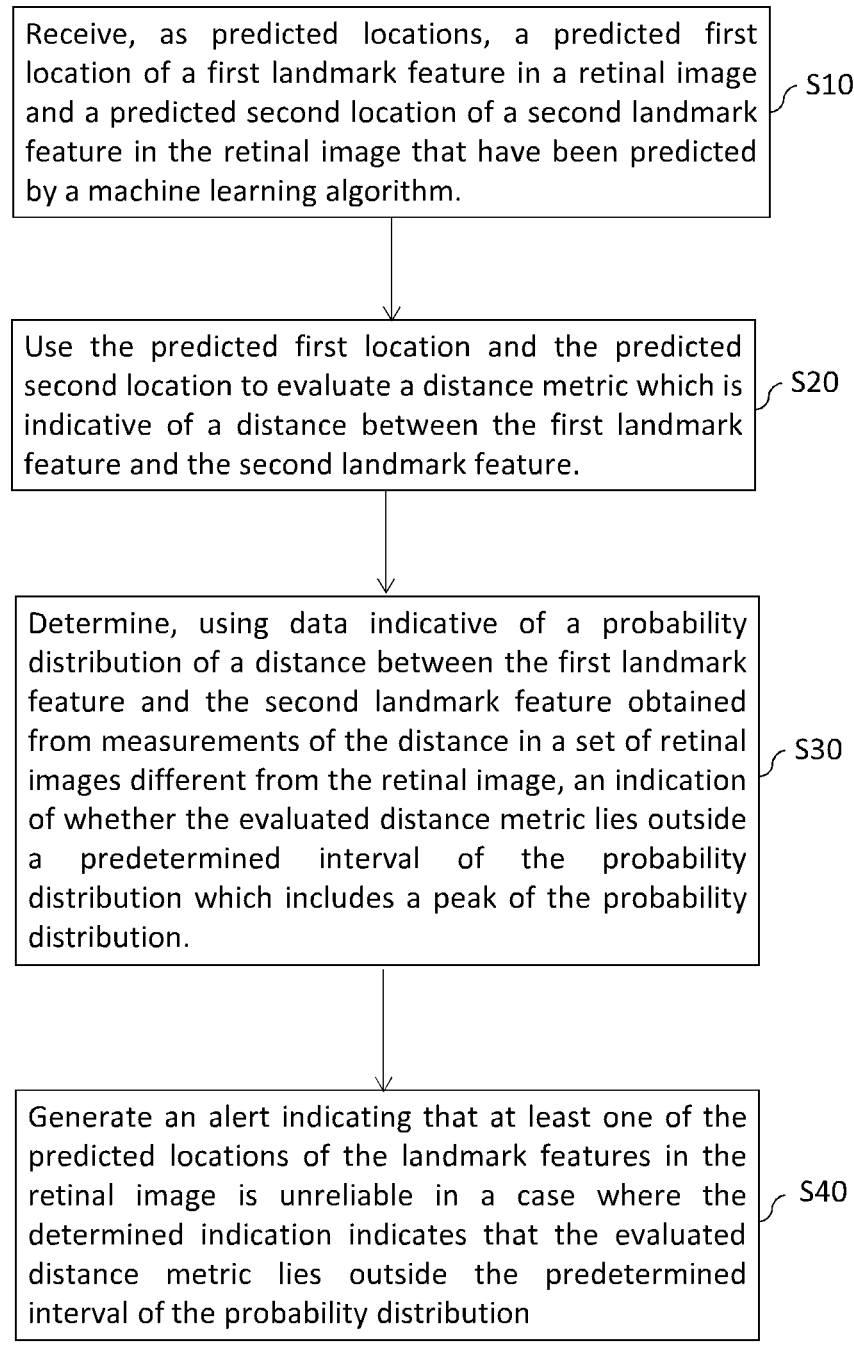
FIG. 3 is a flow diagram illustrating a computer-implemented method of alerting a user to an unreliability in at least one predicted location of a landmark feature in a retinal image in accordance with the first example embodiment herein.

FIG. 3 is a flow diagram illustrating a computer-implemented method according to the first example embodiment herein, by which the apparatus 60 processes, as predicted locations of landmark features in a retinal image of at least a portion of a retina, the first location $L_1$ of the first landmark feature in the retinal image and the second location $L_2$ of the second landmark feature in the retinal image that have been predicted by the landmark location prediction module 50, to alert a user of the apparatus 60 to an unreliability in at least one of the predicted locations of the landmark features. The landmark location prediction module 50 may use a common machine learning algorithm to predict both the first location $L_1$ of the first landmark feature in the retinal image and the second location $L_2$ of the second landmark feature in the retinal image, or it may alternatively use a first machine learning algorithm to predict the first location $L_1$ of the first landmark feature and use a second machine learning algorithm, which is different from the first machine learning algorithm, to predict the second location $L_2$ of the second landmark feature in the retinal image. The processing operations described below with reference to FIG. 3 may be performed after the image acquisition module 40 has acquired the retinal image, and once the landmark location prediction module 50 has made its predictions of the first location $L_1$ of the first landmark feature and the second location $L_2$ of the second landmark feature in the retinal image.

In step S10 of FIG. 3, the receiver module 61 receives, as the predicted locations, a predicted first location $L_1$ of the first landmark feature in the retinal image and a predicted second location $L_2$ of a second landmark feature in the retinal image that have been predicted by at least one machine learning algorithm of the landmark location prediction module 50. Each of the landmark features may be, by example, any anatomical feature of the retina that is located at substantially the same location in the left or right eye of a plurality of different (human) subjects. In the present example embodiment, the first landmark feature comprises an image of a fovea in the retinal image, and the second landmark feature comprises an image of an optic disc in the retinal image. However, the first landmark feature and second landmark feature are not limited to these anatomical features, and may comprise other anatomical features that are imaged in the retinal image. Furthermore, each predicted location of a landmark feature may, as in the present embodiments be received as the coordinates of the landmark features in the retinal image, for example, as the X-Y coordinates of a pixel of the retinal image, which pixel forms part of the image of in the landmark feature.

In step S20 of FIG. 3, the distance metric evaluation module 62 uses the predicted first location and the predicted second location to evaluate a distance metric which is indicative of a distance between the first landmark feature and the second landmark feature. Example forms of the distance metric are described below.

In step S30 of FIG. 3, the outlier detector module 63 determines, using data indicative of a probability distribution of a distance between the first landmark feature and the second landmark feature obtained from measurements of the distance between the first landmark feature and the second landmark feature in retinal images different from the retinal image, an indication of whether the evaluated distance metric is an outlier value lying outside a predetermined interval of the probability distribution. This indication may, as in the present example embodiment, indicate whether the evaluated distance metric lies outside a predetermined interval of the probability distribution which includes at least one peak of the probability distribution. A set of retinal images different the retinal image are images of substantially the same portion of the retina as that imaged (by system 10) to obtain the retinal image for which the location predictions have been performed by the landmark location prediction module 50.

In step S40, in a case where the indication determined by the outlier detector module 63 in step S30 of FIG. 3 indicates that the evaluated distance metric lies outside the predetermined interval (e.g., a predetermined interval (I)) of the probability distribution, the alert generator module 64 generates an alert indicating that at least one of the predicted locations of the landmark features in the retinal image is unreliable. The alert may be provided in any suitable or desirable form for the user, for example, as a message or sign displayed on a display device such as a computer screen, and additionally or alternatively as an audio signal, for example, to notify the user that at least one of the predicted locations in the retinal image is unreliable. On the other hand, in a case where the indication determined by the outlier detector module 63 in step S30 of FIG. 3 indicates that the evaluated distance metric does not lie outside the predetermined interval (I) of the probability distribution, the alert generator module 64 does not generate an alert, and the processing of FIG. 3 ends.

It should be noted that, although the alert generator module 64 generates the alert (e.g. in the form of a visual, audio and/or haptic alert) when the outlier detector module 63 has determined that the evaluated distance metric lies outside the predetermined interval (I) of the probability distribution, the generation of the alert by the alert generator module 64 may be subject to one or more further conditions. For example, a further condition may be that a user of the ocular imaging system 10 provides the ocular imaging system 10 (via an input device such as a keyboard, touchpad or mouse, for example) with an instruction to be alerted to the detection of any outliers by the outlier detection module 63 after a plurality of retinal images have been acquired and processed by the ocular imaging system 10 as described above. Alternatively, a further condition may be that a predetermined number of retinal images has been acquired and processed by the ocular imaging system 10 as described above. In both of these examples, the alert generator module of the above-described configurations may generate an identifier indicating the prediction location(s) which has/have been determined by the apparatus 10 to be unreliable, and/or identifying the retinal image(s) from among the acquired and processed retinal images which have been processed by the machine learning algorithm to yield the unreliable prediction so that the user can be alerted to the one or more retinal images that need to be inspected by the user once all of the conditions are fulfilled.

Figure 4:
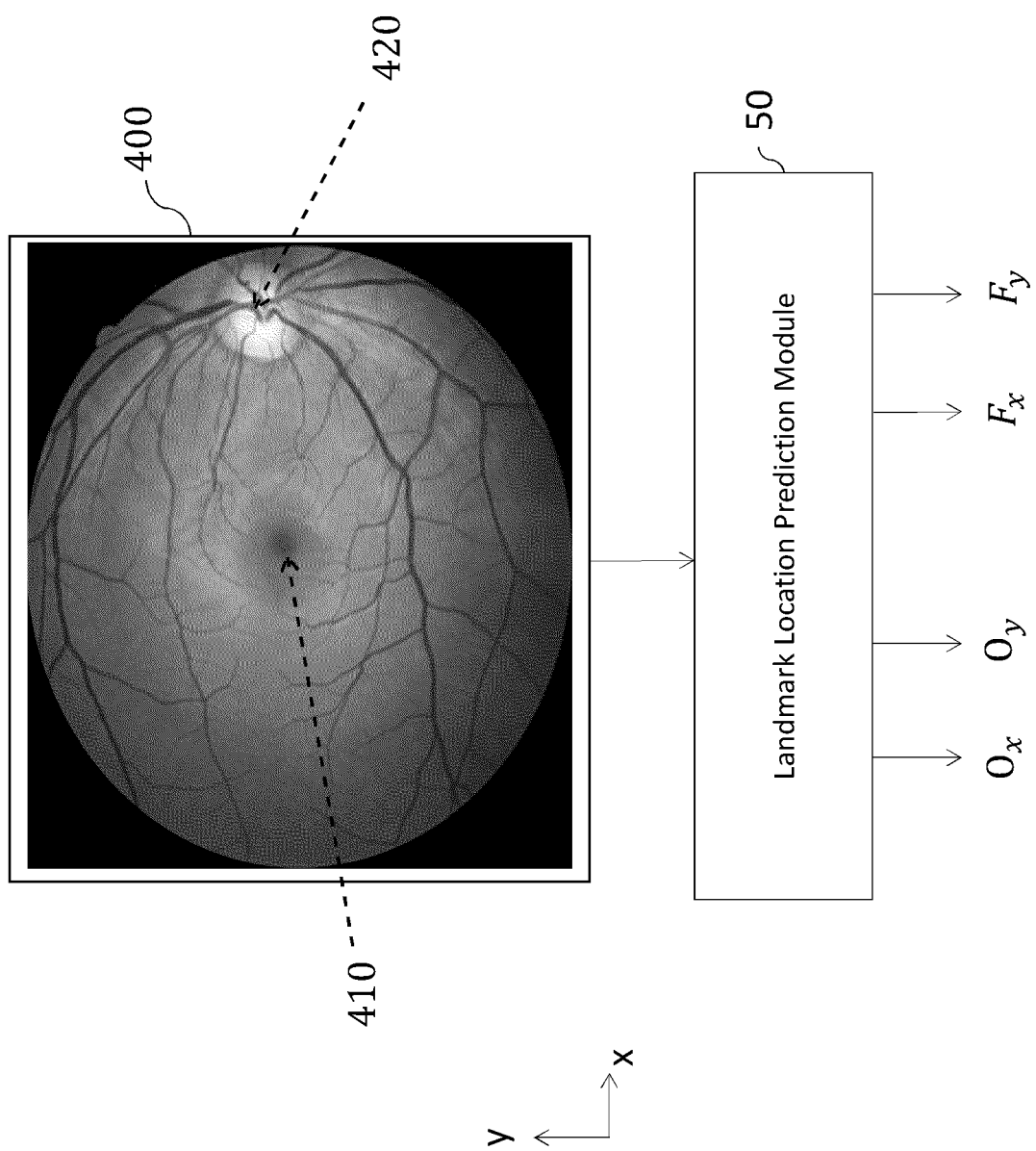
FIG. 4 illustrates a processing by a machine learning algorithm of an acquired retinal image, which shows a fovea as a first landmark feature of the retina and an optic disc as a second landmark feature of the retina, to predict the location of the first landmark feature and the second landmark feature in the retinal image in the first example embodiment herein.

FIG. 4 illustrates an example of a retinal image 400 showing a fovea 410 as an example of the first landmark feature of the retina, and an optic disc 420 as an example of the second landmark feature of the retina. The retinal image 400 is acquired by the ocular imaging system 10 of the present example embodiment shown in FIG. 1, and is input to the landmark location prediction module 50, which is configured to use a machine learning algorithm to predict the location of the fovea 410 and the location of the optic disc 420 in the retinal image 400. In the present example embodiment, the machine learning algorithm comprises a convolutional neural network (CNN) configured to predict the locations of the fovea 410 and the optic disc 420 in the retinal image 400. However, any suitable machine learning algorithm can be used to perform the prediction. In addition, the landmark location prediction module 50 may, as in the present example embodiment, predict, as the location $L_1$ of the fovea 410 and the location $L_2$ of the optic disc 420 in the retinal image 400, the X-Y coordinates of the fovea 410 and X-Y coordinates of the optic disc 420 in the retinal image 400, the retinal image 400 having an X-dimension and a Y-dimension. In FIG. 4, the predicted X-Y coordinates for the fovea 410 in the retinal image 400 are denoted by $(F_x, F_y)$ and the predicted X-Y coordinates for the optic disc 420 in the retinal image 400 are denoted by $(O_x, O_p)$.

Furthermore, the landmark location prediction module 50 may, as in the present example embodiment, be configured to use the machine learning algorithm to classify the retinal image 400 as belonging to one of a plurality of predetermined different classes, based on the predicted coordinates $(F_x, F_y)$ of the fovea 410 and the predicted coordinates $(O_x, O_y)$ of the optic disc 420 in the retinal image 400. The alert generated by the alert generator module 64 in this example embodiment therefore indicates that the classification of the retinal image by the landmark location prediction module 50 is unreliable. As noted above, the alert may be an audio alert generated by an audio signal generator (e.g. computer speaker) of the ocular imaging system 10 and/or a visual alert generated on a display device (e.g. computer screen) of the ocular imaging system 10, which may prompt the user to correct the classification of the retinal image by inspecting the retinal image on the display of the ocular imaging system 10 and entering the correct classification using an input device (such as a keyboard, mouse or trackpad, for example) of the ocular imaging system 10. In this way, the landmark location prediction module 50 may classify retinal images automatically using the machine learning algorithm, only requiring the user to intervene by deciding on a correct classification and providing the decided classification in cases where the landmark location prediction module 50 has generated an unreliable prediction of a landmark feature location and consequently made an unreliable classification.

By way of an example, the landmark location prediction module 50 of the present example embodiment is configured to classify the retinal image as belonging to one of two retinal image classes, namely a first class being a class of retinal images of a left eye, or a second class being a class of retinal images of a right eye of a subject. However, the number of classes is not limited to two, and other types of classifications may be performed. For example, in some example embodiments, the landmark location prediction module 50 may additionally or alternatively be configured to use the predicted locations of the first landmark and the second landmark to classify the retinal image as being of a healthy eye or a non-healthy eye. In other example embodiments, the different classes may relate to different respective gaze directions of the eye, for example a central gaze, inferior gaze, superior gaze, nasal gaze, temporal gaze, each of which may be specified for either the right eye or the left eye. Thus, the landmark location prediction module 50 may classify each retinal image being processed as belonging to one of 10 different classes in such example embodiments.

Figure 5:
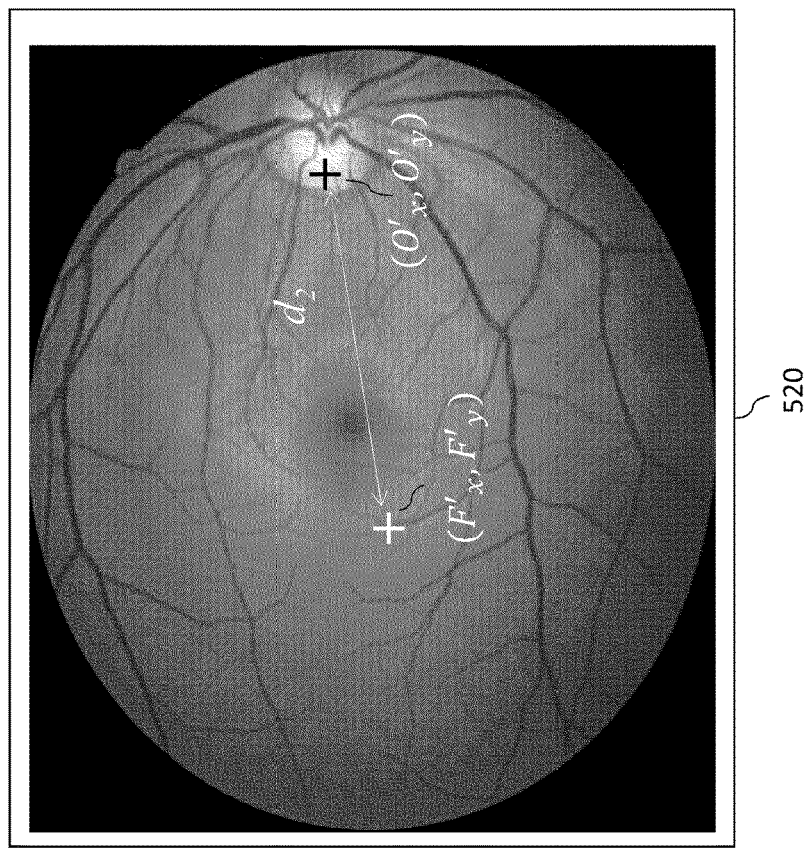
FIG. 5 illustrates predicted locations of the fovea and the optic disc in two different retinal images of the same region of the retina, which are generated in the first example embodiment herein.
Figure 5:
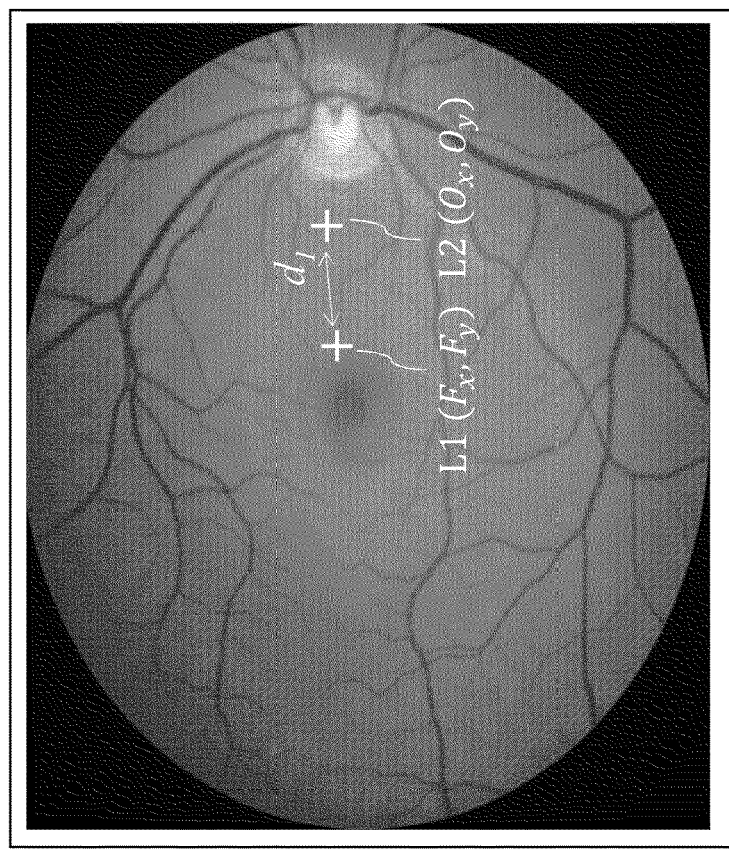

The distance metric referred to in steps S20, S30 and S40 of FIG. 3 may, as in the present example embodiment, comprise a Euclidean distance between the first landmark feature and the second landmark feature. As an example, FIG. 5 illustrates the predicted locations of the fovea and the optic disc in two different retinal images 510, 520 which have been processed by the landmark location prediction module 50. For retinal image 510, the landmark location prediction module 50 predicts the coordinates of the fovea as $(F_x, F_y)$ and the coordinates of the optic disc as $(O_x, O_y)$, with the predicted coordinates illustrated as "+" in retinal image 510. Furthermore, the distance metric evaluation module 62 evaluates, as the distance metric, the Euclidean distance between $(F_x, F_y)$ and $(O_x, O_y)$, which is denoted as $d_1$ in retinal image 510. Similarly, for retinal image 520, the landmark location prediction module 50 predicts the coordinates of the fovea as $(r_x, r_y)$ and predicts the coordinates of the optic disc as $(O'_x, O'_y)$, with the predicted coordinates illustrated as "+" in retinal image 520. Furthermore, the distance metric evaluation module 62 evaluates, as the distance metric, the Euclidean distance between $(F_x',F_y')$ and $(O'_x, O'_y)$, which is illustrated as $d_2$ in retinal image 520.

Figure 6:
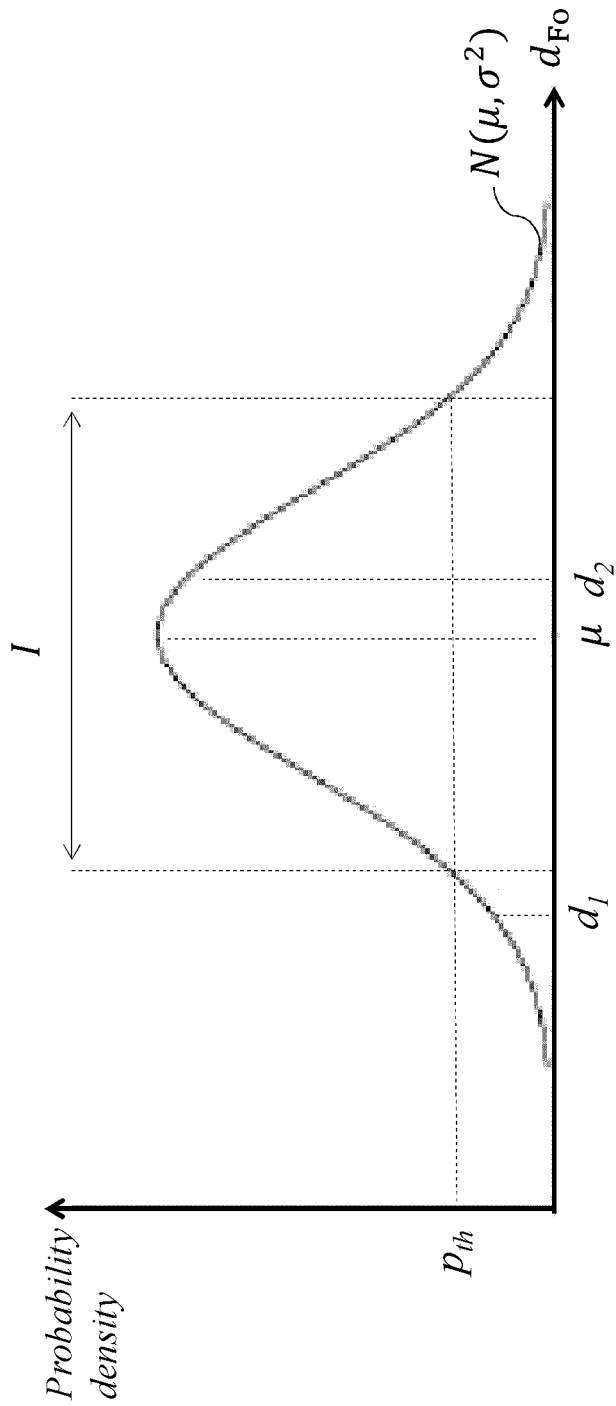
FIG. 6 illustrates a probability distribution of a distance between the fovea and the optic disc, which is based on measurements of the distance in a set of retinal images and employed in the first example embodiment herein.

The probability distribution referred to in step S30 of FIG. 3 may, as in the present example embodiment, take the form of a normal distribution $N(\mu, \sigma^2)$ of the Euclidean distance between the first landmark feature and the second landmark feature that is obtained from measurements of the Euclidean distance in a set of retinal images different from the retinal image (acquired by system 10) for which predictions are made. As an example, FIG. 6 illustrates the probability distribution of the Euclidean distance between the fovea and the optic disc in retinal images based on observations of the distance between the fovea and the optic disc in the set of retinal images. The probability distribution in FIG. 6 may, as in the present example embodiment, be the ground-truth distribution, and the set of retinal images from which the probability distribution is derived may comprise the training dataset of retinal images that were used to train the machine learning algorithm to perform the prediction of landmark feature locations. However, the probability distribution need not be based on retinal images in the training dataset and any suitable set of retinal images may be used to obtain the probability distribution of the Euclidean distance between the fovea and the optic disc.

In the example of FIG. 6, the predetermined interval of the probability distribution, which is used to determine the reliability of the predicted locations, is illustrated as a predetermined interval I around the mean $\mu$ of the normal distribution. FIG. 6 also illustrates the value $d_1$ (corresponding to the distance between the predicted locations $(F_x, F_y)$ and $(O_x, O_y)$ in retinal image 510 in FIG. 5) and the value $d_2$ (corresponding to the distance between coordinates $(F'_x, F'_y)$ and $(O'_x, O'_y)$ in retinal image 520 in FIG. 5). In the example of FIG. 6, for retinal image 510 in FIG. 5, the outlier detector module 63 determines, using the probability distribution in FIG. 6, an indication that the evaluated distance $d_1$ lies outside the predetermined interval I, and the alert generator module 64 consequently generates an alert indicating that at least one of the predicted locations of the landmark features in the retinal image 510 is unreliable. However, for retinal image 520 shown in FIG. 5, the evaluated distance $d_2$ falls within the predetermined interval I and the alert generator module 64 consequently generates no alert in this case, as the predicted locations of the landmark features in retinal image 520 are determined to be reliable.

In some example embodiments, the predetermined interval I may be defined as a function of the standard deviation $\sigma$ of the normal distribution. However, predetermined interval may also be defined in other ways, using any suitable method for outlier identification. For example, the predetermined interval may be defined as a range of values of distance for which the value of the probability distribution function (for the probability distribution of step S30) exceeds a predetermined likelihood threshold. In other words, a predetermined likelihood threshold $p_{th}$ can be set and the outlier detector module 63 may be configured to determine the predicted locations of the optic disc and fovea to be reliable only if the value of the probability distribution function for the value of the evaluated distance metric (between the predicted locations of the fovea and the optic disc) is below the predetermined likelihood threshold $p_{th}$.

Although the examples described with reference to FIGS. 5 and 6 evaluate the Euclidean distance between the predicted locations of the fovea and the optic disc, it should be noted that any other suitable distance metric may be used. For example, in some example embodiments, the distance metric may instead provide a measure of a Manhattan distance between the location of the first landmark feature and the location of the second landmark feature. Furthermore, in example embodiments where the evaluated distance metric comprises the Manhattan distance, data indicative of a probability distribution of the Manhattan distance the between the first landmark feature and the second landmark feature obtained from measurements of the Manhattan distance in a set of retinal images different from the retinal image, may be used to determine the indication of whether the evaluated distance metric lies outside the predetermined interval of the probability distribution.

In some example embodiments, an additional weighting factor may be applied to the evaluated distance metric, in order to emphasise outliers. More specifically in some example embodiments, the distance metric may comprise a weighted distance between the first landmark feature and the second landmark feature, the weighted distance being a product of the distance between the first landmark feature and the second landmark feature and a weighting factor whose value increases with increasing absolute values of a difference between the distance and a value of the distance corresponding to the peak of the probability distribution. The distance metric which is weighted to calculate the weighted distance may be the Euclidean distance, in which case the probability distribution used by the outlier detector module 63 is the Euclidean distance between the first landmark feature and the second landmark feature obtained from measurements of the Euclidean distance in a set of retinal images different from the retinal image (for which location predictions are made). Alternatively, the distance which is weighted to calculate the weighted distance may be the Manhattan distance, in which case the probability distribution used by the outlier detector module 63 is the Manhattan distance the between the first landmark feature and the second landmark feature obtained from measurements of the Manhattan distance in a set of retinal images different from the retinal image for which location predictions are made.

Figure 7:
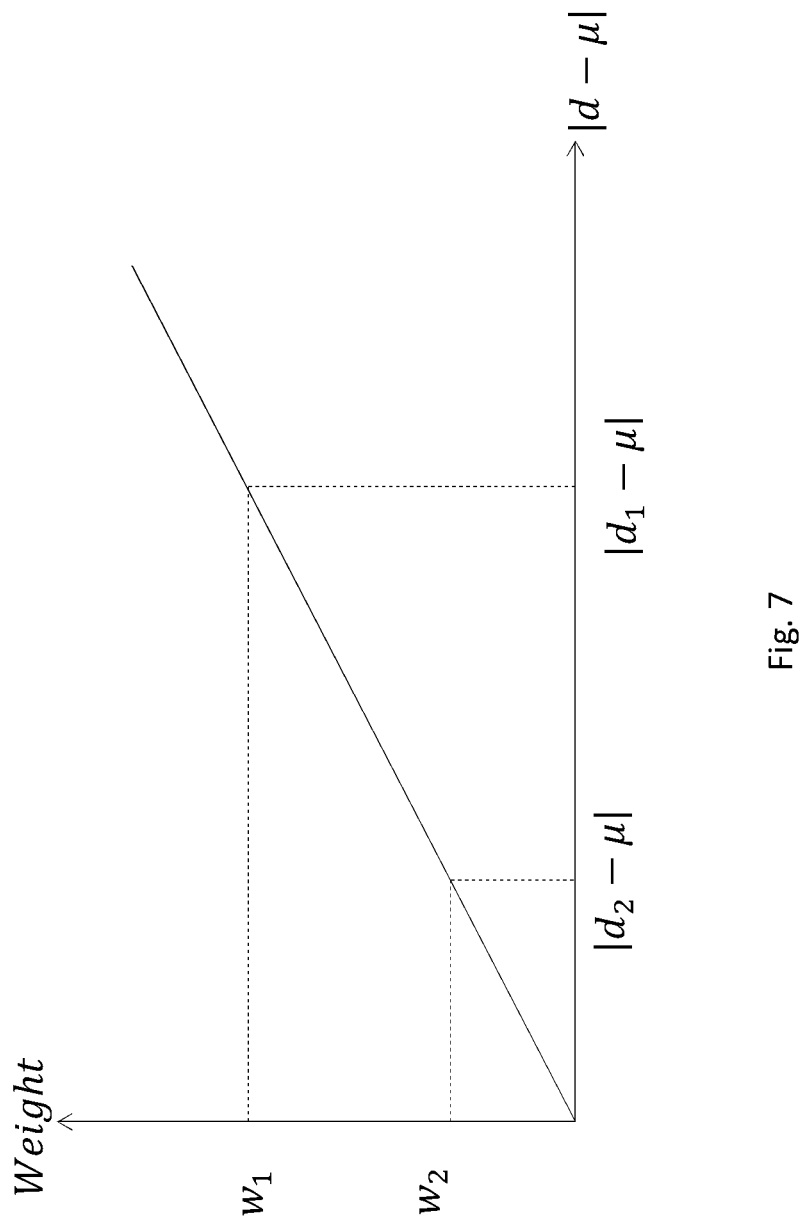
FIG. 7 illustrates a weighting function that can be multiplied with an evaluated distance metric to calculate a weighted distance metric in accordance with an example embodiment herein.

FIG. 7 illustrates a non-limiting example of a mapping function between $|d-\mu|$ and a weighting factor w which can be used to weight the evaluated distance metric d (which is indicative of the distance between predicted location of the fovea and the predicted location of the optic disc), wherein $\mu$ denotes the mean of the probability distribution and therefore the distance value corresponding to the peak of the probability distribution. In the mapping function of FIG. 7, corresponding weighting factors are determined for the evaluated Euclidean distances $d_1$ and $d_2$ for retinal images 510 and 520 in FIG. 5, respectively. In the example of FIG. 7, the outlier detector module 63 determines for retinal image 510 (associated with an evaluated distance of $d_1$), a distance $|d_1-\mu|$ and determines a corresponding weight $w_1$ using the mapping function in FIG. 7. The outlier detector module 63 further applies weight $w_1$ to the evaluated distance, for example by calculating the weighted metric $w_1|d_1-\mu|$, and then determines an indication of whether $w_1|d_1-\mu|$ falls within the predetermined interval I of the probability distribution in FIG. 6, which represents the expected distribution of the Euclidean distance between the fovea and optic disc.

As shown in FIG. 7, a similar process is performed by the distance metric evaluation module 62 and the outlier detector module 63 for retinal image 520 in the alternative embodiments described above. Firstly, a weighting factor of $w_2$ corresponding to the evaluated Euclidean distance $d_2$ (indicative of a distance between the predicted location of the fovea and the predicted location of the optic disc for retinal image 520) is determined, and the weighted distance metric $w_2|d_2-\mu|$ is calculated by the distance metric evaluation module 62, and the outlier detector module 63 determines whether $w_2|d_2-\mu|$ falls within the predetermined interval I in order to evaluate the reliability of the predicted locations of the fovea and the optic disc for retinal image 520. As shown in FIG. 7, because $|d_1-\mu|$ is greater than $|d_2-\mu|$, the weight $w_1$ applied to $|d_1-\mu|$ is greater in value that the weight $w_2$ applied to $|d_2-\mu|$.

It should be noted that the calculation of the weight factor w is not limited to use of the linear function illustrated in FIG. 7, and may instead employ any suitable variation of the weighting factor where the weighting factor increases with increasing absolute values of a difference between the evaluated distance and a value of the distance corresponding to the peak of the probability distribution.

In the above-described example embodiments, an evaluated distance metric, which is indicative of a distance between the predicted location of a first landmark feature and the predicted location of a second landmark feature in a retinal image, is used to determine the reliability of the predicted locations. However, there exists a possibility that the evaluated distance metric falls within the predetermined interval of the probability distribution despite the predicted locations of the landmark features significantly deviating from the expected locations of the landmark features. In this scenario, the alert generator module 64 would fail to generate an alert indicating that at least one of the predicted locations of the landmark features in the retinal image is unreliable.

Figure 8:
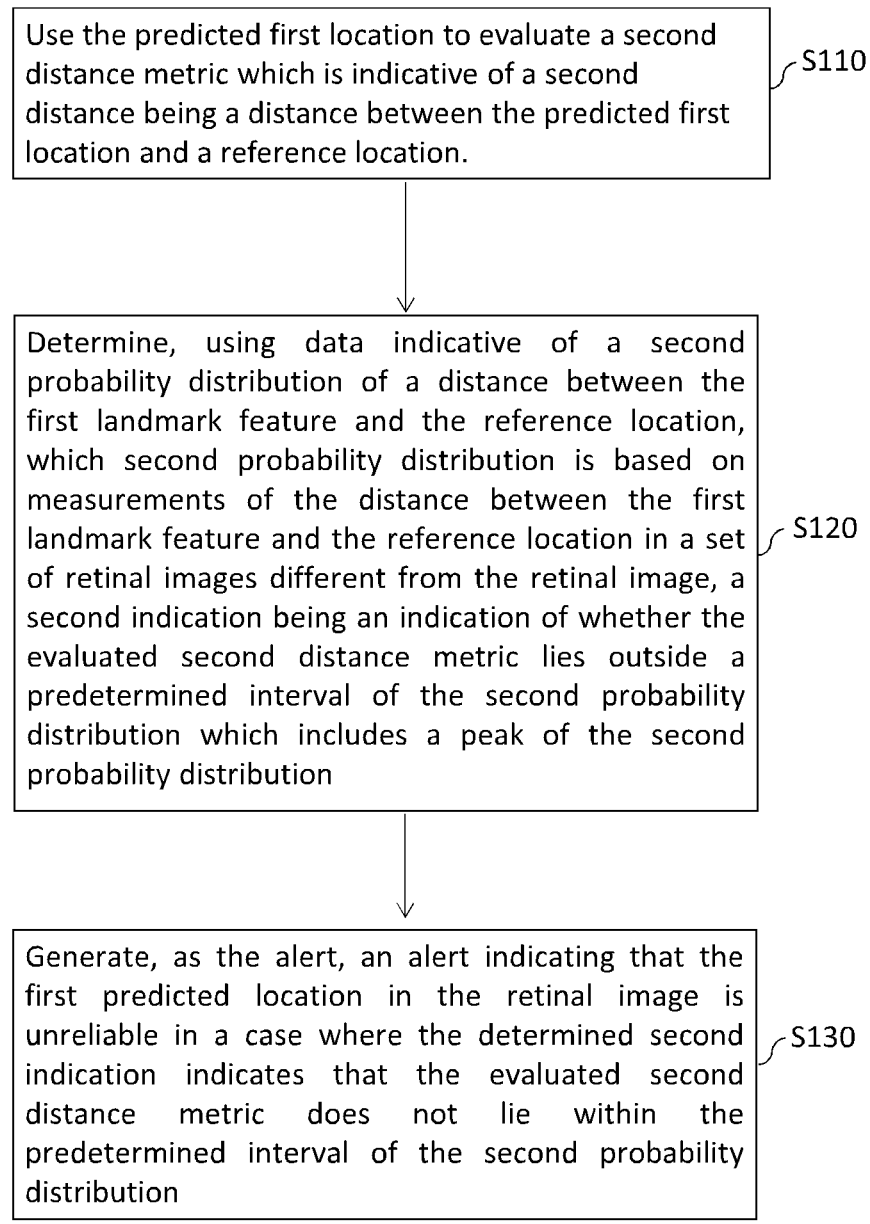
FIG. 8 is a flow diagram illustrating a computer-implemented method of detecting an unreliable predicted location of a landmark feature in a retinal image by using a second evaluated distance metric and a second probability distribution, in accordance with an example embodiment herein.

FIG. 8 is a flow diagram of an optional process steps that may be performed by the apparatus 60 to address the aforementioned problem, and which can be combined with any of the previously described embodiments to improve the reliability determinations of the predicted locations of landmark features in a retinal image. In step S110 of FIG. 8, the distance metric evaluation module 62 further uses the predicted first location $L_1$ (of the first landmark feature) to evaluate a second distance metric which is indicative of a second distance between the predicted first location and a reference location (e.g., reference location $L_{ref}$).

Then, in step S120 of FIG. 8, the outlier detector module 63 further determines a second indication using data indicative of a second probability distribution of a distance between the first landmark feature and the reference location $L_{ref}$, wherein the second probability distribution is based on measurements of the distance in a set of retinal images different from the retinal image (under examination). The second indication is indicative of whether the evaluated second distance metric lies outside a predetermined interval r of the second probability distribution which includes a peak of the second probability distribution.

In step S130 of FIG. 8, the alert generator module 64 generates, as the alert, an alert indicating that the first predicted location $L_1$ in the retinal image 510 is unreliable in a case where the determined second indication indicates that the evaluated second distance metric does not lie within the predetermined interval I' of the second probability distribution.

Figure 9B:
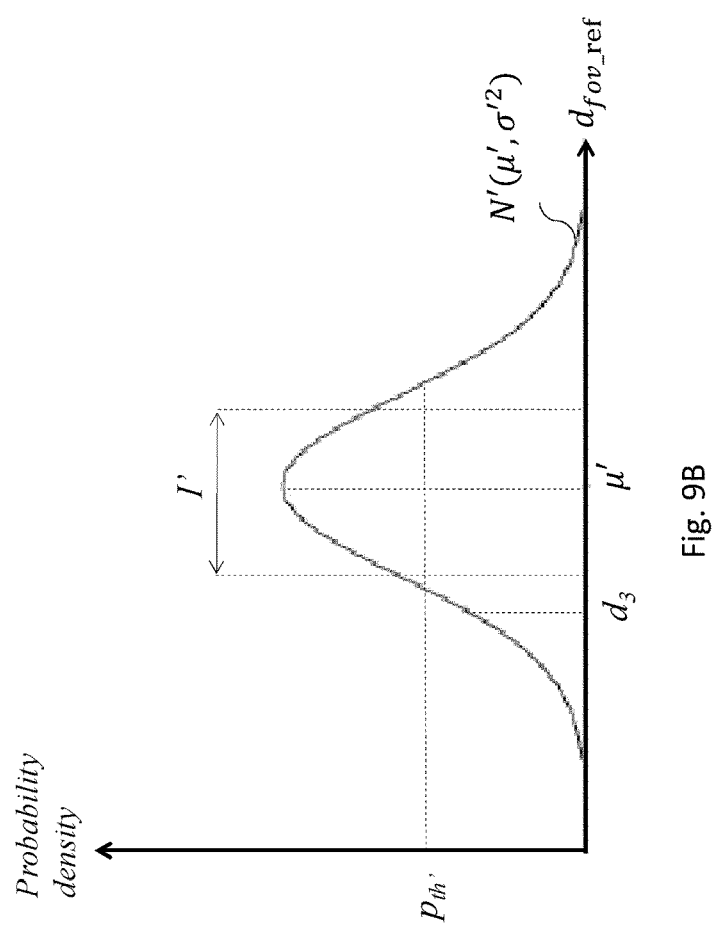
FIG. 9B illustrates an example of a second probability distribution, which can be used to determine the reliability of the predicted location of the fovea in the example retinal image of FIG. 9A.
Figure 9A:
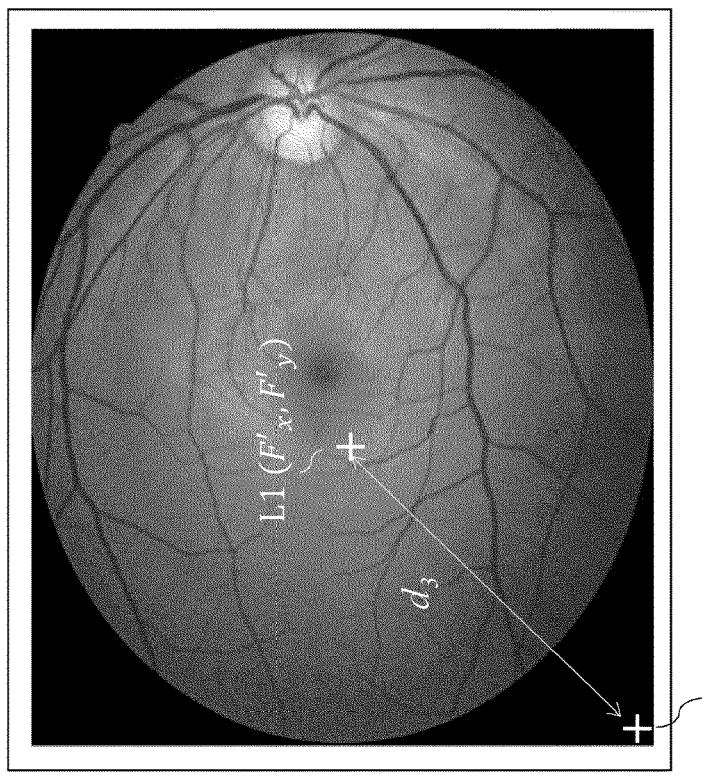
FIG. 9A shows an example retinal image having superimposed therein an example of an evaluated second distance metric, in form of a Euclidean distance between the predicted location of the fovea in the retinal image and a reference location in a retinal image.

FIG. 9A illustrates an example of the second distance metric using the retinal image 520 of FIG. 5. More specifically, FIG. 9A illustrates the predicted location $L_1$ of the first landmark (fovea) at coordinates $(F_x', F_y')$, a reference location $L_{ref}$ at coordinates $(L_{ref\_x}, L_{ref\_y})$, and a Euclidean distance $d_3$ between $(F_x', F_y')$ and $(L_{ref\_x}, L_{ref\_y})$. In the present example in FIGS. 9A and 9B, the reference location $(L_{ref\_x}, L_{ref\_y})$ is taken as the (0,0) coordinate of the retinal image, which is taken, by way of an example, to be the bottom left-hand corner of the retinal image. However, the reference location is not limited in this regard and may be any location in the retinal image, provided that the same reference location is used for all of the retinal images in the set of retinal images to obtain the second distribution of distance between the first landmark feature and the reference location.

FIG. 9B illustrates an example of the second probability distribution, which can be used to determine the reliability of the predicted location $L_1$ of the fovea in FIG. 9A. In FIG. 9B, the second probability distribution takes the form of a normal distribution $N'(\mu', \sigma'^2)$ of the measured Euclidean distance between the fovea and the reference location $L_{ref}$ at coordinates $(L_{ref\_x}, L_{ref\_y})$ in a set of retinal images different from the acquired retinal image. FIG. 9B further illustrates the predetermined interval I' used in step S120 that is used by the outlier detector module 63 to determine the reliability of the predicted location $(F_x', F_y')$ of the fovea. In the example in FIG. 9B, the predetermined interval I' is set as the range of distance values for which the value of the probability density function exceeds a predetermined likelihood threshold $P_{th}'$. However, the predetermined interval I' is not limited in this regard and may be set using any suitable manner for performing outlier detection known to the person skilled in the art. Furthermore, as with the probability distribution $N(\mu, \sigma^2)$ in FIG. 6, the set of retinal images from which $N'(\mu', \sigma'^2)$ is derived may comprises the set of retinal images used to train the machine learning algorithm used by the landmark location prediction module 50. However, other retinal images of the same portion of the retina as in the retinal image may also be used.

In the present example illustrated by FIGS. 9A and 9B, the distance evaluation module 62 evaluates, as the second distance metric in step 110, a Euclidean distance of $d_3$ between $(F_x', F_y')$ and $(L_{ref\_x}, L_{ref\_y})$ in the retinal image of FIG. 9A. The outlier detector module 63 further determines, in step S120 of FIG. 8, an indication that the evaluated Euclidean distance $d_3$ lies outside the predetermined interval I' of the normal distribution A $N'(\mu', \sigma'^2)$. As a result, the alert generator module 64 generates, as the alert, an alert indicating that the first predicted location L1 in the retinal image is unreliable.

It should be noted that the second distance metric is not limited to the Euclidean distance and may instead comprise the Manhattan distance between the first landmark feature and the reference location. In the case where the second distance metric is the Manhattan distance, the second probability distribution is a probability distribution of the Manhattan distance the between the first landmark feature and the reference location of the first landmark feature obtained from measurements of the Manhattan distance in a set of retinal images different from the retinal image.

In addition, in some example embodiments, the second distance metric may be weighted by a second weighting factor whose value increases with increasing absolute values of a difference between the evaluated second distance metric and a value of the distance corresponding to the peak of the second probability distribution. The weighted second distance metric may subsequently be used to evaluate the reliability of the first landmark feature by determining if the weighted second distance metric falls within the predetermined interval of the second probability distribution, in a similar manner as previous described in relation to the weight distance metric in FIG. 7.

It should be noted that in some example embodiments, the outlier detector module 63 may be configured to determine the reliability of the predicted first location $L_1$ of the first landmark feature by using data indicative of a third probability distribution of the location of the first landmark feature in a retinal image that is based on a set of retinal images different from the retinal image, to determine a third indication that is indicative of whether the predicted first location $L_1$ lies outside a predetermined interval of the third probability distribution which includes a peak of the third probability distribution. In these example embodiments, the alert generator module 64 generates an alert indicating that the predicted first location is unreliable in a case where the determined third indication indicates that the predicted first location does not lie within the predetermined interval of the third probability distribution. The predicted location of the first landmark feature may, as in previous example embodiments, be defined by coordinates representing the location of a pixel in the retinal image and the third probability distribution may, for example, be a two-dimensional distribution of the observed location of the first landmark feature in the set of retinal images. As with the previous example embodiments, the predetermined interval of the third probability distribution may be set using any suitable method.

In the first example embodiment described in relation to FIGS. 1 to 9, a distance metric indicative of a distance between the predicted locations of a first landmark feature and a second landmark feature is compared with an observed distribution to determine the reliability of the predicted locations and therefore the reliability of any subsequent retinal image classification process performed using the predicted locations.

In the second example embodiment described herein, which provides an alternative to the first example embodiment, the reliability of the predicted location of a landmark feature in a retinal image is determined using a mixture model that is obtained using the ground truth locations of the landmark features in a dataset of retinal images. The dataset comprises retinal images of a plurality of predetermined classes and the probability that the retinal image belongs to each of the predetermined classes is computed using the predicted location of the landmark feature and the mixture model in order to check the reliability of the predicted location.

Figure 10:
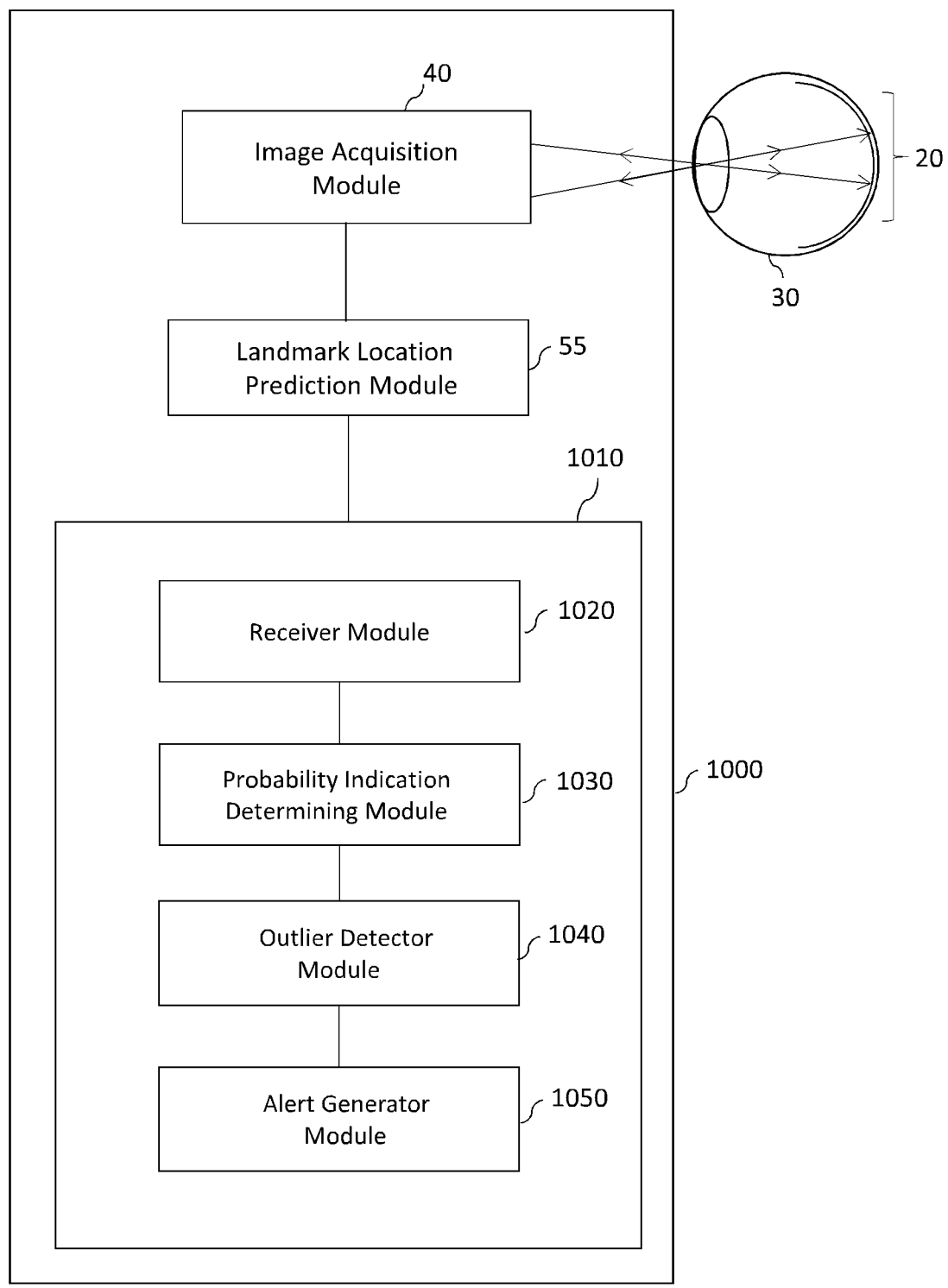
FIG. 10 is a schematic illustration of an ocular imaging system comprising an apparatus for detecting an unreliability in a predicted location of a landmark feature in a retinal image, in accordance with a second example embodiment described herein.

FIG. 10 illustrates a schematic illustration of an ocular imaging system 1000 in accordance with a second example embodiment herein. In FIG. 10, the ocular imaging system 1000 comprises the same image acquisition module 40 as in FIG. 1. Furthermore, the ocular imaging system 1000 comprises a landmark location prediction module 55 which is configured to use a machine learning algorithm to predict a location of at least one landmark feature in a retinal image of at least a portion of a retina 20 of an eye 30. In one example embodiment herein, the ocular imaging system 1000 and/or the landmark location prediction module 500 can include, be formed by and/or be implemented by, the signal processing apparatus 200 of FIG. 2, in programmable signal processing hardware.

Figure 11:
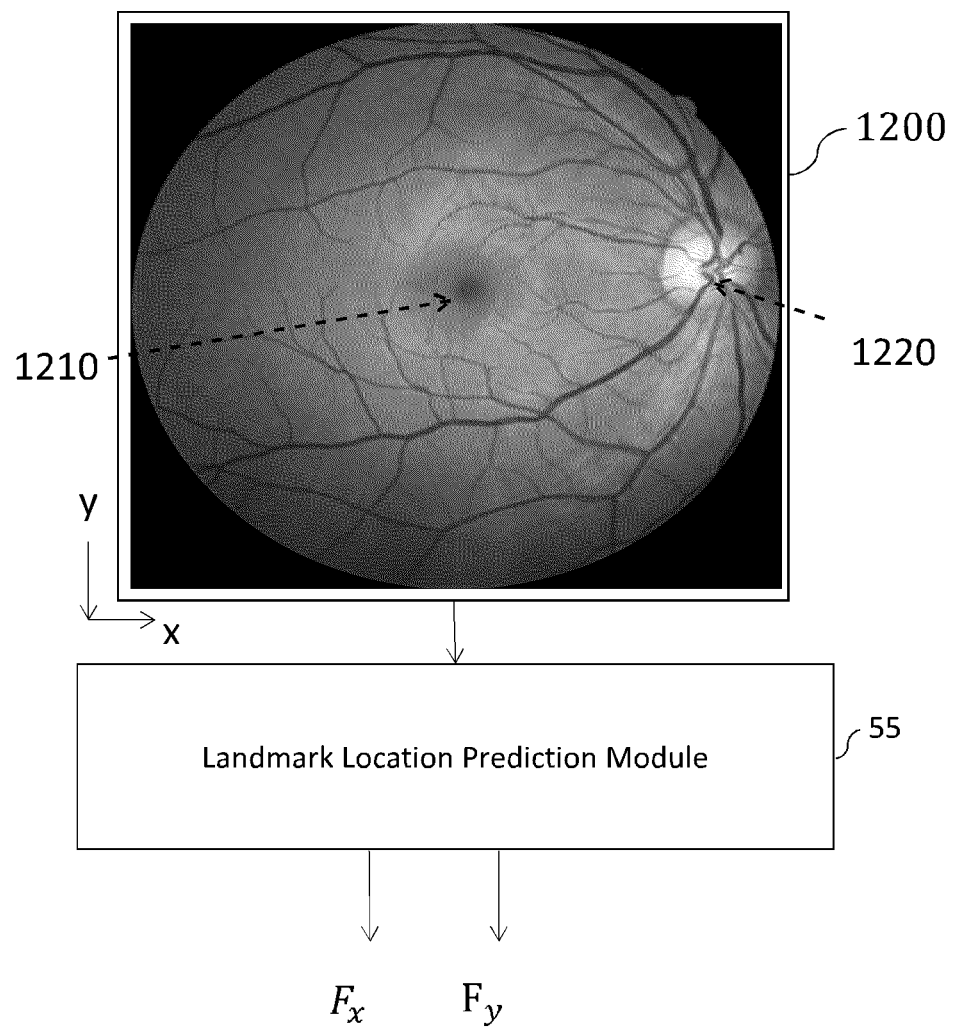
FIG. 11 illustrates a processing by a machine learning algorithm of an acquired retinal image to predict the location of the landmark feature in the retinal image in the second example embodiment.

FIG. 11 illustrates an example of a retinal image 1200, and shows a fovea 1210 as an example of the landmark feature of the retina 20. The retinal image 1200 is acquired by the ocular imaging system 1000 shown in FIG. 10, and is input to the landmark location prediction module 55, which uses a machine learning algorithm to predict the location of the fovea 1210 in the retinal image 1200. In the present example, the machine learning algorithm comprises a convolutional neural network (CNN) configured to predict the location of the fovea in the retinal image 1200 although other any suitable machine learning algorithms can be used to perform the prediction. In addition, the landmark location prediction module 55 may, as in the present example embodiment, predict, as the location $L_1$ of the fovea 1210 in the retinal image 1200, the X-Y coordinates of the fovea 1210, the retinal image 1200 having an X-dimension and a Y-dimension. In FIG. 11, the predicted X-Y coordinates for the fovea 1210 in the retinal image 1200 are denoted by (Fx, Fy).

Returning to FIG. 10, the ocular imaging system 1000 further comprises an apparatus 1010 for generating an alert which indicates an unreliability in the predicted location of the landmark feature in the retinal image. The apparatus 1010 comprises a receiver module 1020, a probability indication determination module 1030, an outlier detector module 1040 and an alert generator module 1050. Example implementations of the apparatus 1010 and the functionality of its illustrated component modules are described in more detail below. The apparatus 1010 may, in some example embodiments, be implemented using the signal processing apparatus 200 of FIG. 2

Figure 12:
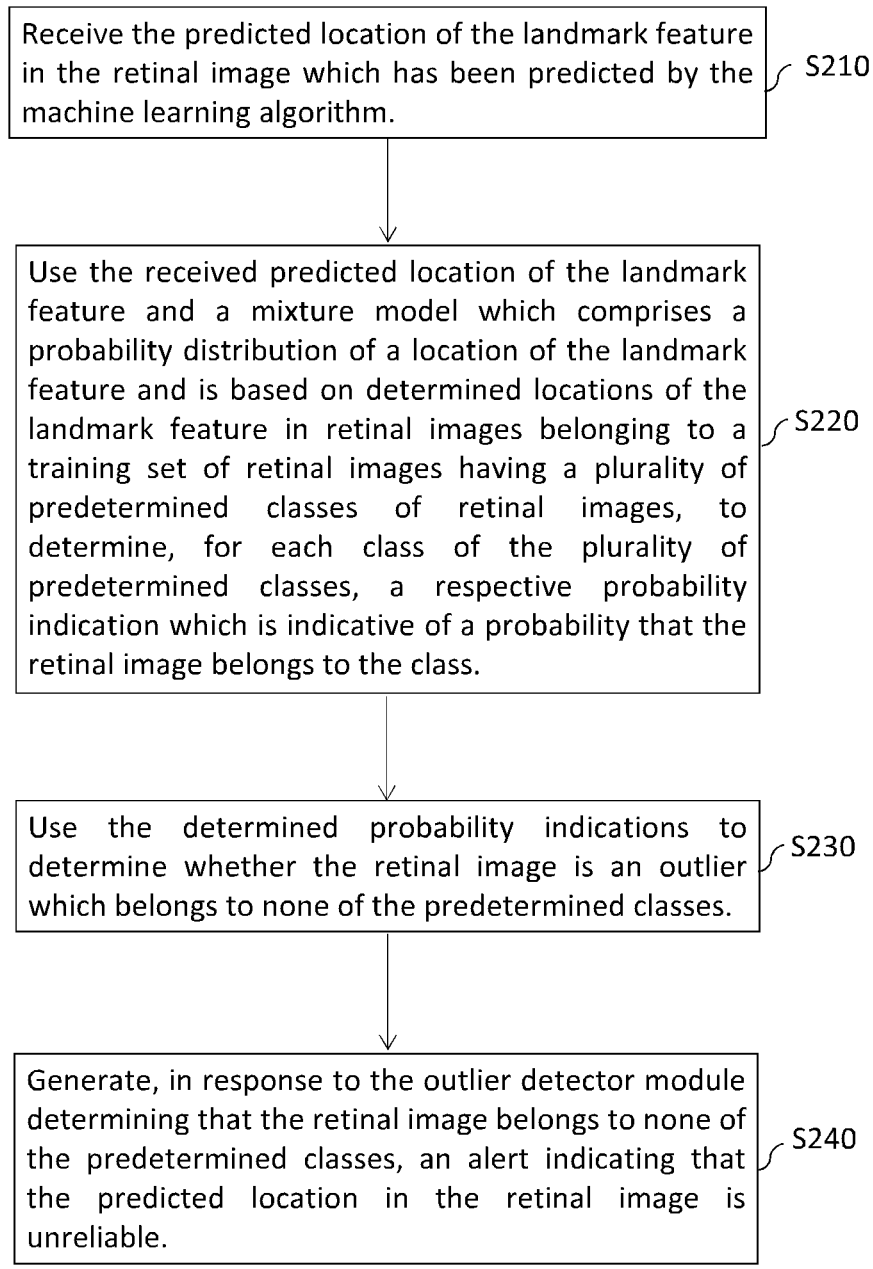
FIG. 12 is a flow diagram illustrating a computer-implemented method employed in the second example embodiment, which uses a mixture model to detect unreliability in the predicted location of a landmark feature in a retinal.

FIG. 12 is a flow diagram illustrating a computer-implemented method executed in the second example embodiment, by which the apparatus 1010 generates an alert which indicates an unreliability in a predicted location of a landmark feature in the retinal image which has been predicted by the landmark location prediction module 55. The landmark feature in the retinal image may, as in the present example, comprise a fovea in the retinal image. However, the landmark feature is not limited in this regard and may be any other landmark feature as defined above, such as an optic disc in the retinal image, for example.

In step S210 of FIG. 12, the receiver module 1020 receives the predicted location of the landmark feature in the retinal image which has been predicted by the landmark location prediction module 55 using the machine learning algorithm. The machine learning algorithm may, as in the present example embodiment, comprise a convolutional neural network (CNN) configured to predict the location of the landmark feature in the retinal image. However, any suitable machine learning algorithm capable of feature identification can be used to perform the prediction.

In step S220 of FIG. 12, the probability indication determining module 1030 uses the received predicted location of the landmark feature and a mixture model, which comprises a probability distribution of a location of the landmark feature and is based on determined locations of the landmark feature in retinal images belonging to a set of retinal images having a plurality of predetermined classes of retinal images, to determine, for each class of the plurality of predetermined classes, a respective probability indication which is indicative of a probability that the retinal image belongs to the class.

In step S230 of FIG. 12, the outlier detector module 1040 uses the determined probability indications to determine whether the retinal image is an outlier which belongs to none of the predetermined classes.

The outlier detector module 1040 may, as in the present example embodiment, use the determined probability indications to determine in step S230 whether the retinal image belongs to none of the predetermined classes by determining whether each probability indication of the determined probability indications exceeds a threshold value. In a case where none of the determined probability indications exceeds the threshold value, the outlier detector module 1040 determines that the retinal image belongs to none of the predetermined classes. Furthermore, in a case where at least one of the determined probability indications exceeds the threshold value, the outlier detector module 1040 determines that the retinal image belongs to at least one of the predetermined classes.

In response to the outlier detector module 1040 determining that the retinal image belongs to none of the predetermined classes, the alert generator module 1050 generates, in step S240 of FIG. 12, an alert indicating that the predicted location in the retinal image is unreliable. The alert may be provided in any suitable or desirable form for the user of the ocular imaging system 1000, for example as a message or sign displayed on a display device such as a computer screen of the ocular imaging system 1000, and additionally or alternatively as an audio signal, for example, to notify the user that the predicted location in the retinal image is unreliable.

On the other hand, in a case where the probability indication determined by the outlier detector module 1040 in step S230 does not indicate the retinal image to be an outlier, the alert generator module 1050 does not generate an alert.

The landmark location prediction module 55 may, as in the present example embodiment, further classify the retinal image as belonging to one of the plurality of predetermined classes, based on the predicted location of the landmark feature in the retinal image. Furthermore, the alert, which is generated in the case where the predicted location has been determined to be unreliable, may indicate that the classification of the retinal image by the machine learning algorithm is unreliable. In addition, the landmark location prediction module 55 may, as in the present example embodiment, classify the retinal image as belonging the one of the plurality of predetermined classes by classifying the retinal image as being a retinal image of either a left eye or a right eye of a subject. However, the plurality of predetermined classes is not limited to the example of the two classes for left eye/right eye classification, and other types of classification may additionally or alternatively be performed. For example, in other example embodiments, the landmark location prediction module 55 may additionally or alternatively be configured to use the predicted location of the landmark feature to classify the retinal image as being of a healthy eye or a non-healthy eye. In other examples, the different classes may relate to different respective gaze directions of the eye, for example central gaze, inferior gaze, superior gaze, nasal gaze, temporal gaze, each of which may be specified for either the right eye or the left eye. In addition, the machine learning algorithm need not be configured to perform any retinal image classification, and may only be used to predict the location of a landmark feature.

Figure 13:
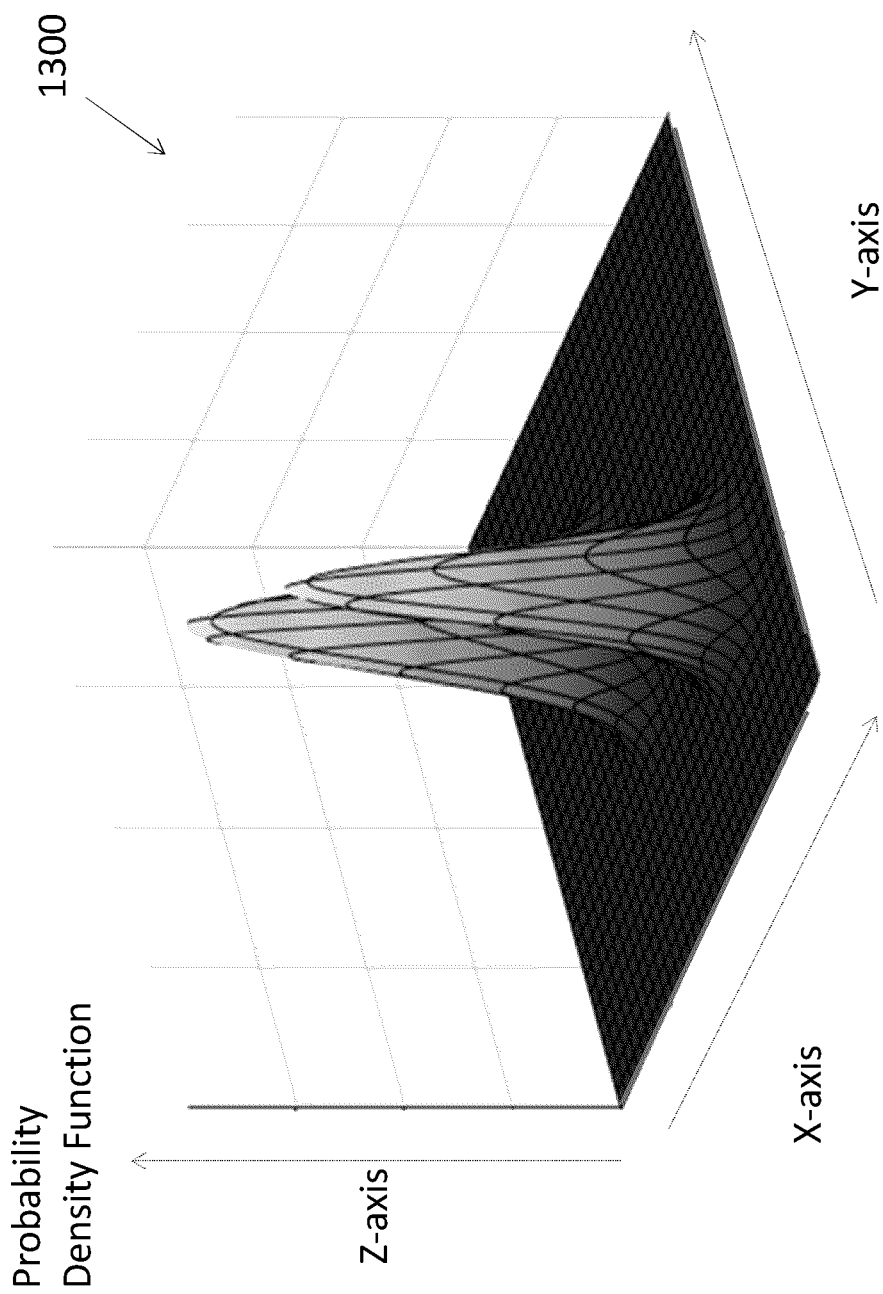
FIG. 13 illustrates an example of a mixture model which can be used in the second example embodiment to verify the reliability of the predicted location of a landmark feature in a retinal image.

FIG. 13 illustrates an example of a probability density distribution 1300 of a mixture model which can be used to determine the reliability of the predicted location of the landmark feature (the fovea in the present example) in a retinal image, in accordance with an example implementation of the second example embodiment. In FIG. 13, the mixture model comprises a two-dimensional Gaussian mixture model which is obtained using the ground truth or expected locations of the fovea in a dataset of retinal images. The dataset of retinal images used in the present example embodiment comprises retinal images of two predetermined classes, namely a left-eye class and a right-eye class. Furthermore, in the present example embodiment, the location of the fovea is represented by the X-Y coordinates of a pixel of the retinal image that comprises the landmark feature, wherein the retinal image comprises an X-dimension and a Y-dimension as illustrated in FIG. 13. A third, Z-dimension in FIG. 13 denotes a probability density value that the fovea is located at a corresponding X-Y coordinate position in the retinal image.

For a multivariate Gaussian mixture model with K component distributions $C_i$, (or K clusters, each of which can be modelled by a different Gaussian distribution), the probability density function in terms of variable $\vec{x}$, is given by:

$$p(\vec{x}) = \sum_{i=1}^{K} \phi_i N\left(\vec{x} \mid \vec{\mu}_i, \sum_i\right) \quad (1)$$

wherein $N(\vec{x} \mid \mu_i, \Sigma_i)$ denotes a multivariate Gaussian distribution corresponding to the i-th component distribution (or cluster) and is given by:

$$N\left(\vec{x} \mid \vec{\mu}_i, \sum_i\right) = \frac{1}{\sqrt{(2\pi)^K |\Sigma_i|}} \exp\left(-\frac{1}{2}(\vec{x} - \vec{\mu}_i)^T \sum_i^{-1} (\vec{x} - \vec{\mu}_i)\right) \quad (2)$$

wherein $\vec{\mu}_i$ and $\Sigma_i$ respectively denote the mean and the covariance matrix of the i-th component distribution $C_i$ forming the Gaussian mixture model, and $\phi_i$ is the component distribution weight for the i-th component distribution $C_i$ with the constraint that $$\sum_{i=1}^{K} \phi_i = 1.$$

Given the parameters of a multivariate Gaussian mixture model, the posterior probability that a data vector $\vec{x}$ belong to the i-th component distribution $C_i$ can be calculated using the Bayes Theorem:

$$p(C_i | \vec{x}) = \frac{\phi_i N(\vec{x} | \vec{\mu}_i, \Sigma_i)}{\sum_{j=1}^{K} \phi_j N(\vec{x} | \vec{\mu}_j, \Sigma_j)} \quad (3)$$

For the example Gaussian mixture model described above with reference to FIG. 13, the vector (variable) z of equation (1) can be understood to represent the location of the fovea in the retinal image, namely the X-Y coordinates of a pixel comprised in an image of the fovea. Furthermore, the Gaussian mixture model comprises two component distributions $C_1$ and $C_2$, wherein $C_1$ is characterised by the distribution $N(\vec{x} | \vec{\mu}_1, \Sigma_1)$ and corresponds to a left-eye class of retinal images, while $C_2$ is characterised by the distribution $N(\vec{x} | \vec{\mu}_2, \Sigma_2)$ and corresponds to the right-eye class of retinal images. The two component distributions $C_1$ and $C_2$ are combined using their respective weights $\phi_1$ and $\phi_2$ to form the Gaussian mixture model of FIG. 13. Accordingly, as shown in FIG. 13, the Gaussian mixture model illustrates two peaks corresponding to the respective peak of the two different Gaussian distributions that respectively characterise the distribution of the observed position of the fovea in the left eye and in the right eye. In the present example, the parameters of the Gaussian mixture model in FIG. 13 may be learned from the dataset of retinal images by using the Expectation Maximization technique, which is a well-known maximum likelihood estimation method whose details will not be described further here.

Using the mixture model of FIG. 13 as an example, the receiver module 1020 receives, in step S210 of FIG. 12, the predicted X-Y coordinates of the fovea for a retinal image that has been processed by the CNN-based machine learning algorithm running in the landmark location prediction module 55. In step S220 of FIG. 12, the probability indication determining module 1030 uses the predicted X-Y coordinates of the fovea and the Gaussian mixture model to determine, for each class of the two predetermined classes (left-eye class and right-eye class), a respective probability indication which is indicative of a probability that the retinal image belongs to that class. More specifically, the probability indication determining module 1030 of the present example embodiment calculates, using equation (3) above, the value of the posterior probability $p(C_1 | \vec{x})$ that the predicted X-Y coordinate location of the fovea (denoted by i' in equation (3)) belongs to the component distribution $C_1$ that corresponds to the left-eye class. Furthermore, the probability indication determining module 1030 calculates the posterior probability $p(C_2 | \vec{x})$ that the predicted location belongs to component distribution $C_2$ that corresponds to the right-eye class.

In step S230 of FIG. 12, the outlier detector module 1040 uses the determined values for posterior probabilities $p(C_1 | \vec{x})$ and $p(C_2 | \vec{x})$ to determine whether the retinal image is an outlier which belongs to none of the predetermined classes. For this purpose, the outlier detector module 1040 may, as in the present example embodiment, compare the calculated values for $p(C_1 | \vec{x})$ and $p(C_2 | \vec{x})$ against a predetermined threshold probability $p_t$. In the case where neither the value for $p(C_1 | \vec{x})$ nor the value for $p(C_2 | \vec{x})$ exceeds $p_t$, the outlier detector module 1040 determines that the retinal image belongs to neither of the predetermined two classes in this example, and the alert generator module 1050 then generates in step S240 an alert indicating the predicted location of the fovea to be unreliable. On the other hand, if either of the values for $p(C_1 | \vec{x})$ and $p(C_2 | \vec{x})$ exceeds the predetermined threshold $p_t$, then the outlier detector module 1040 determines that the retinal image does belong that the corresponding class, and the alert generator module 1050 does not generate the alert.

Although the Gaussian mixture model in the present example embodiment is formed using a dataset that comprises two classes of retinal images, the Gaussian mixture model may instead be formed from any number of retinal images classes that may include, but is not limited to, different classification classes described earlier. Furthermore, although the present example embodiment makes use of a two-dimensional Gaussian mixture model, it is noted that higher-dimensional mixture models can also be used, as will be explained in more detail below. In addition, although present example embodiment makes use of a multivariate Gaussian mixture model, it is noted that a univariate mixture model may alternatively be used, for example in the case where the mixture model and the subsequent classification are based on a distance measurement relating to the location of the landmark feature (for example, a distance from a second landmark feature, or the distance from a reference location, as described in relation to the first example embodiment).

Figure 14:
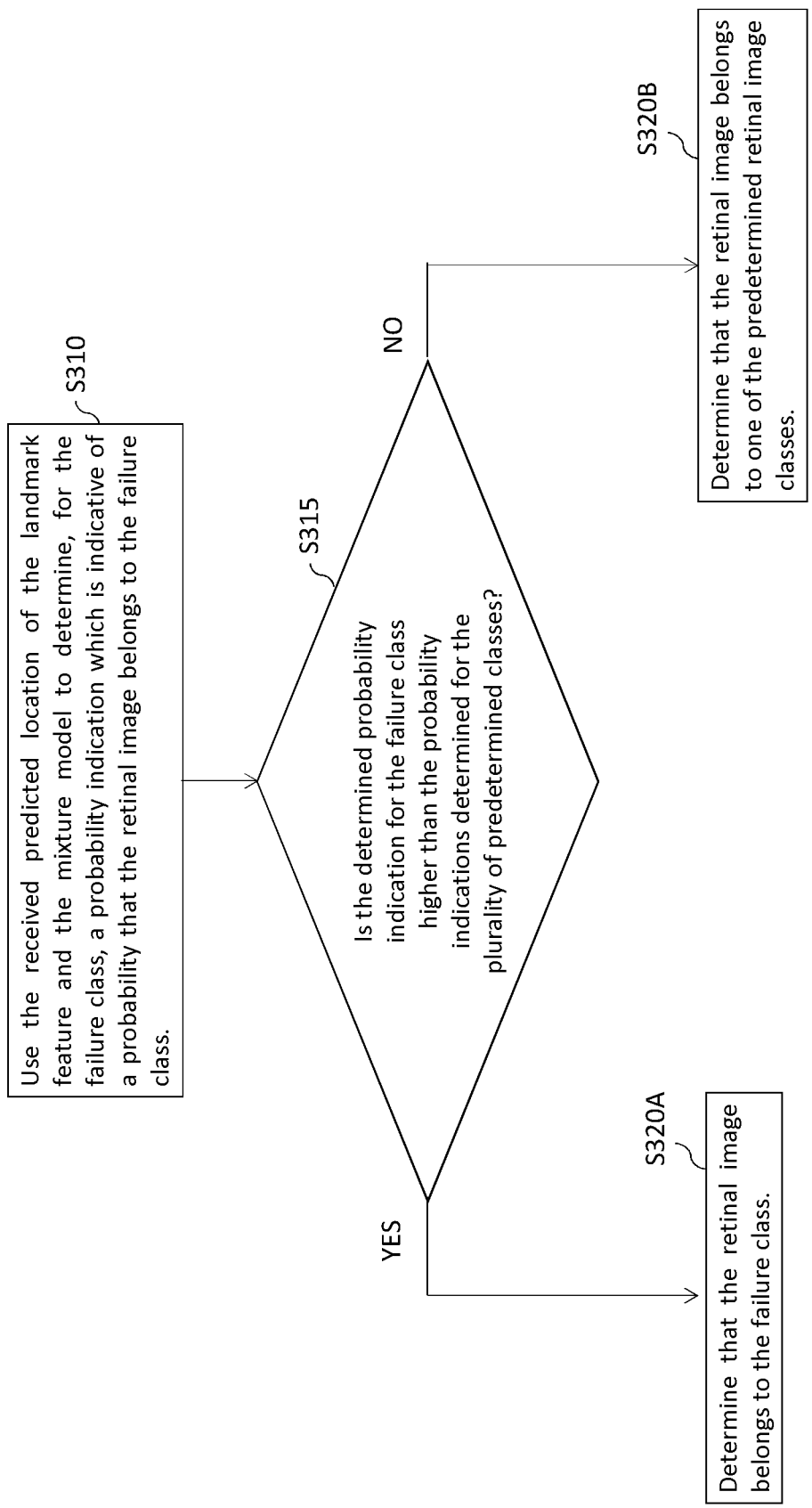
FIG. 14 is a flow diagram illustrating a process performed in a first variant of the second example embodiment, in which the mixture model is further based on determined locations of the landmark feature in retinal images of a predetermined failure class of retinal images.

FIG. 14 illustrates a first variant of the second example embodiment, which further makes use of a "failure class" of retinal images to determine whether the predicted location of the fovea in a retinal image is unreliable. In particular, the inventors have found that machine learning algorithms may cluster their predicted location around a certain region in cases where the prediction fails, for example in cases where the retinal image being processed is obscured by a blinking event, imaging artefacts and the like. In these cases, the failed predictions (namely, the predicted locations of the landmark feature which have been determined to be unreliable by the apparatus 1010) can be used to create a separate "failure class" of retinal images, and can be characterised by a (e.g. Gaussian) distribution that can be used as a component distribution in the mixture model.

More specifically, in the first variant of the second example embodiment, the mixture model used in step S220 of FIG. 12 is further based on determined locations of the landmark feature in retinal images of the failure class of retinal images, whose processing by the machine learning algorithm to predict the respective locations of the landmark feature therein has resulted in predicted locations that have been determined to be unreliable.

The failure class of retinal images, may for example, be obtained by performing the process illustrated in FIG. 12 for a plurality of retinal images, and flagging (e.g. by saving the retinal image file identifiers or the like) only those retinal images for which prediction locations have been determined to be unreliable for subsequent processing. Using the example mixture model of FIG. 13 which comprises two component distributions $C_1$ and $C_2$, the use of a further failure class of retinal images is equivalent to introducing an additional component distribution $C_3$ having a distribution of $N(\vec{x}|\vec{\mu}, \Sigma_3)$ to the gaussian mixture model in FIG. 13, wherein $\vec{\mu}_3$ and $\Sigma_3$ respectively denote the mean and the covariance matrix of the component distribution $C_3$ corresponding to the failure class. The probability density function of the gaussian mixture model comprising the component distributions $C_1$, $C_2$ and $C_3$ is given by:

$$p(\vec{x}) = \sum_{i=1}^{3} \phi_i N\left(\vec{x}|\vec{\mu}_i, \Sigma_i\right) \quad (4)$$

In step S310 of FIG. 14, a variant of the probability indication determining module 1030 (FIG. 10) uses the received predicted location of the landmark feature and the mixture model to determine, for the failure class, a respective probability indication which is indicative of a probability that the retinal image belongs to the failure class. As an example, assuming the mixture model has the probability density function of equation (4), the probability indication determining module 1030 in this example calculates, as the probability indication, the posterior probability $p(C_3|\vec{x})$ for the predicted location $\vec{x}$, wherein $$p(C_3|\vec{x}) = \frac{\phi_3 N\left(\vec{x}|\vec{\mu}_3, \Sigma_3\right)}{\sum_{j=1}^{3} \phi_j N\left(\vec{x}|\vec{\mu}_j, \Sigma_j\right)} \quad (5)$$

In step S315 of FIG. 14, the outlier detector module 1040 determines whether the determined probability indication for the failure class is higher than the probability indications determined for the plurality of predetermined classes. If the probability indication determined for the failure class is higher than the probability indications determined for the plurality of predetermined classes, the outlier detector module 1040 determines in step S320A of FIG. 14 that the retinal image belongs to the failure class (and therefore belongs to none of the predetermined classes). Using the mixture model of equation (4) as an example of mixture model that is further based on a failure distribution, the probability $p(C_1|\vec{x})$ (the probability indication for component distribution $C_1$ representing the left eye class) and the probability $p(C_2|\vec{x})$ (the probability indication for component distribution $C_2$ representing the right eye class) are calculated in step S220 as:

$$p(C_1|\vec{x}) = \frac{\phi_1 N\left(\vec{x}|\vec{\mu}_1, \Sigma_1\right)}{\sum_{j=1}^{3} \phi_j N\left(\vec{x}|\vec{\mu}_j, \Sigma_j\right)} \text{ and} \quad (6)$$

$$p(C_2|\vec{x}) = \frac{\phi_1 N\left(\vec{x}|\vec{\mu}_2, \Sigma_2\right)}{\sum_{j=1}^{3} \phi_j N\left(\vec{x}|\vec{\mu}_j, \Sigma_j\right)} \quad (7)$$

If the calculated value for $p(C_3|\vec{x})$ is greater than the calculated values for $p(C_1|\vec{x})$ and $p(C_2|\vec{x})$, then the outlier detector module 1040 of the variant of the second example embodiment determines (in step S320A) that the retinal image belongs to the failure class and therefore to none of the predetermined classes.

On the other hand, if the probability indication determined for the failure class is not higher than the probability indications determined for the plurality of predetermined classes, the outlier detector module 1040 of the variant of the second example embodiment determines in step S320B of FIG. 14 that the retinal image belongs to at least one of the predetermined retinal image classes. As an example, referring the mixture model defined by equation (4), the outlier detector module 1040 may determine the retinal image to belong either to the left-eye class in the event that the calculated value for $p(C_1|\vec{x})$ exceeds the calculated value of $p(C_3|\vec{x})$, or determine the retinal image to belong to the right eye class in the event that the calculated value for $p(C_2|\vec{x})$ exceeds the calculated value for $p(C_3|\vec{x})$.

Figure 15:
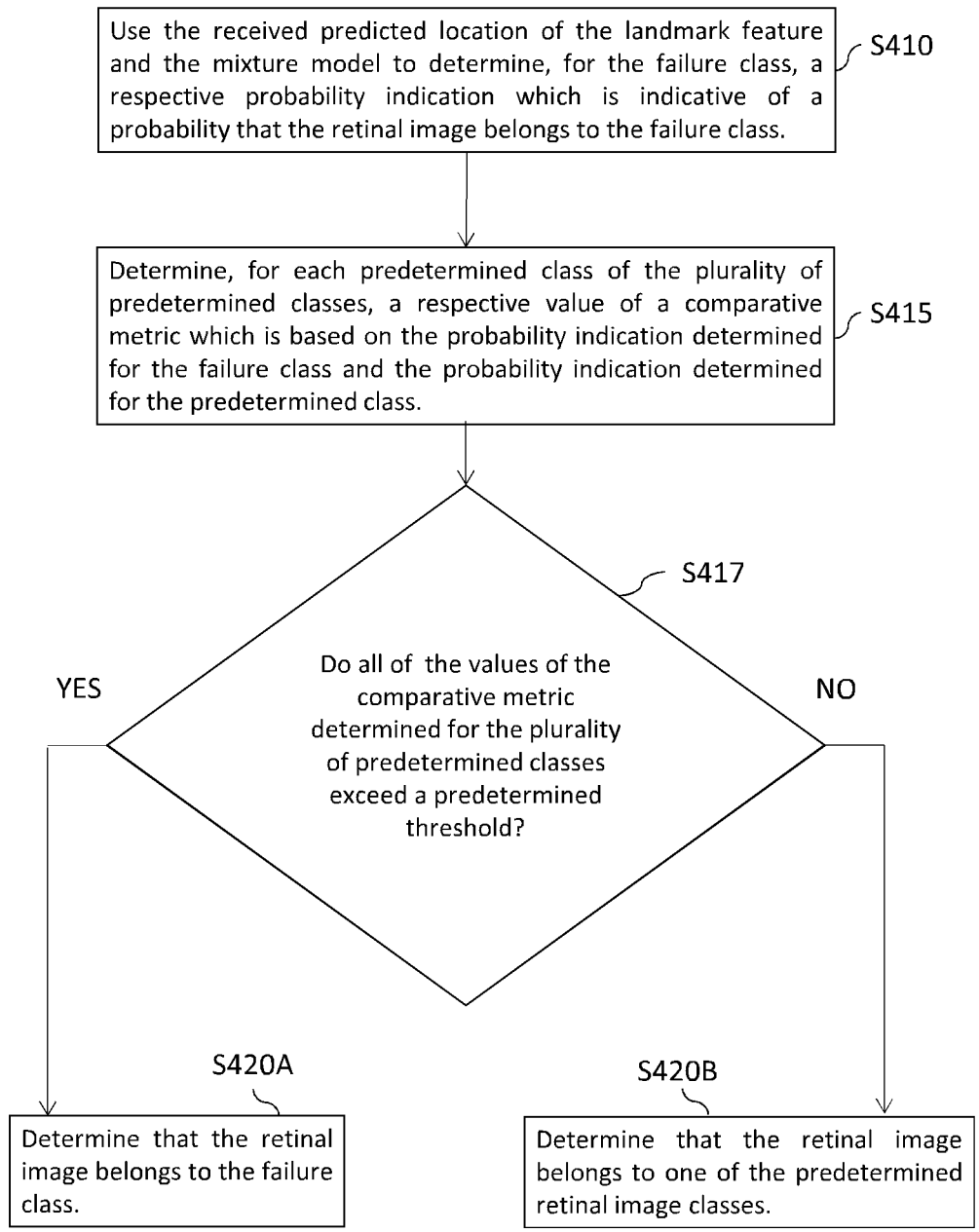
FIG. 15 is a flow diagram illustrating a process performed in a second variant of the second example embodiment, which makes use of a comparative metric to determine whether the retinal image belongs to one of the predetermined classes of retinal images.

FIG. 15 is a flow diagram illustrating a process performed in a second variant of the second example embodiment, which also uses a mixture model that is further based on determined locations of the landmark feature in retinal images of a failure class of retinal images whose processing by the machine learning algorithm to predict the respective locations of the landmark feature therein has resulted in predicted locations that have been determined to be unreliable.

In step S410 of FIG. 15, the probability indication determining module 1030 of the second variant uses the received predicted location of the landmark feature and the mixture model to determine, for the failure class, a probability indication which is indicative of a probability that the retinal image belongs to the failure class. This step is therefore the same as step S310 in FIG. 14.

However, in contrast with the first variant of the second example embodiment, the probability indication determination module 1030 of the second variant of the second example embodiment does not directly compare the probability indication for the failure class with the probability indications calculated for the predetermined classes to determine whether the retinal image belongs to none of the predetermined classes. Instead, in Step S415 of FIG. 15, the probability indication determining module 1030 of the second variant determines, for each predetermined class of the plurality of predetermined classes, a respective value of a comparative metric which is based on the probability indication determined for the failure class and the probability indication determined for the predetermined class.

In some examples, the probability indication determination module 1030 may be configured to determine a respective value of a ratio of the probability indication determined for the failure class and the probability indication determined for the predetermined class as the value of the comparative metric for each predetermined class of the plurality of predetermined classes in step S415. For example, referring to equations (5), (6) and (7) which can be used to calculate the respective probability indication for the failure class ($C_3$), the left eye class ($C_1$) and the right eye class ($C_2$), the comparative metric for the left-eye class can be calculated as the ratio $p(C_3|\vec{x})/p(C_1|\vec{x})$, for a predicted location of the fovea denoted by the vector variable $\vec{x}$. Similarly, the comparative metric for the right-eye class can be calculated as the ratio $p(C_3|\vec{x})/p(C_2|\vec{x})$, for a predicted location of the fovea denoted by the vector variable i'. However, it should be noted that the comparative metric used in Step S415 is not limited to a ratio of the probability indication determined for the failure class and the probability indication determined for the predetermined class. For example, in an alternative implementation of the comparative metric in Step S415, the probability indication determination module 1030 may instead determine a respective value based on a difference between the probability indication determined for the failure class and the probability indication determined for the predetermined class as the value of the comparative metric for each predetermined class of the plurality of predetermined classes.

In step S417 in FIG. 15, the outlier detector module 1040 of the second variant determines whether all of the values of the comparative metric determined for the plurality of predetermined classes exceed a predetermined threshold. If the outlier detector module 1040 determines that all of the values of the comparative metric determined for the plurality of predetermined classes do exceed the predetermined threshold, the outlier detector module 1040 of the second variant determines in step 5420A of FIG. 15 that the retinal image belongs to the failure class and therefore to none of the predetermined classes. On the other hand, if the outlier detector module 1040 determines that not all of the values of the comparative metric determined for the plurality of predetermined classes exceed the predetermined threshold, the outlier detector module 1040 of the second variant determines in step 5420B of FIG. 15 that the retinal image belongs to at least some of the predetermined classes.

In the second example embodiment and the variants thereof described above, the predicted landmark location is taken to be the predicted location of a single landmark feature (namely, the location of the fovea in a retinal image), for ease of explanation. As the predicted location is received as a two-dimensional, X-Y coordinate pair that denotes the location of a pixel in the retinal image comprising in an image of the fovea, the mixture model in these example embodiments takes the form of a two-dimensional mixture model. However, as explained by way of example below, the mixture model is not limited to being two-dimensional, and may have a dimensionality greater than two.

In a further (third) variant of the second example embodiment described with reference to FIGS. 10 and 12, the receiver module 1020 of the third variant may receive the predicted location of multiple landmark features in the retinal image, and the apparatus 1010 of the variant may determine whether at least one of the predicted locations is unreliable. More specifically, in the third variant, the receiver module 1020 may be configured to receive, as the predicted location of the landmark feature in the retinal image, a predicted location of a first landmark feature in the retinal image and a predicted location of a second landmark feature in the retinal image which have been predicted by the machine learning algorithm. For instance, the first landmark feature may, as in previous examples, be a fovea in the retinal image, while the second landmark feature may be an optic disc in the retinal image.

Furthermore, the probability indication determining module 1030 of the third variant may be configured to use the received predicted location of the first landmark feature, the received predicted location of the second landmark feature, and the mixture model, which further comprises a probability distribution of a location of the second landmark feature and is further based on determined locations of the second landmark feature in the retinal images belonging to the set of retinal images, to determine, for each class of the plurality of predetermined classes, the respective probability indication which is indicative of the probability that the retinal image belongs to the class. As an example, assuming that the predicted location of each of the first landmark feature and the second landmark feature is denoted by a two-dimensional, X-Y coordinate pair, then the mixture model comprising the ground-truth probability distribution of a four-coordinate variable representing the observed locations of the fovea and the optic disc will be a four-dimensional Gaussian mixture model which can be written in the same general form as given in equation (1). Furthermore, knowing the parameters characterizing each component distribution (corresponding to each predetermined class), the probability indication indicative of the probability that the retinal image belongs to each of the predetermined classes can be calculated using equation (3) in the same manner as described for previous examples.

In addition, the alert generator module 1050 of the third variant may be configured to generate, as the alert, an alert indicating that at least one of the predicted locations of the first landmark feature or the predicted location of the second landmark feature in the retinal image is unreliable.

In the example embodiments described herein, the apparatus for generating an alert indicating an unreliability in a landmark location prediction made by a machine learning algorithm forms part of an ocular imaging system having an image acquisition module and a landmark location prediction module. However, the described apparatus need not form part of an ocular imaging system and may instead be provided as a stand-alone data processing device such a PC or the like, which is configured to process predicted locations of landmark features of retinal images. In such applications, the alert generator module of the above-described example embodiments may generate an identifier indicating the prediction location(s) which has/have been determined by the apparatus to be unreliable, and/or identifying the retinal image(s) which has/have been processed by the machine learning algorithm to yield the unreliable prediction so that the identifier can be used by the alert generator module to generate an alert for the user which draws the user's attention to the one or more predicted locations and/or retinal images that need to be inspected by the user.

The example aspects described herein avoid limitations, specifically rooted in computer technology, arising from an unreliability of computer-implemented machine-learning techniques for predicting locations of landmark features in retinal images. Such computer-implemented machine learning techniques may provide inaccurate retinal landmark location predictions under certain circumstances, for example, when a large portion of the retinal image being processed by the machine learning algorithm is occluded due to a blinking event, imaging artefacts or the like. The inaccurate predictions can adversely affect the performance of downstream processing operations, the success of which depends on the accuracy of landmark feature location predictions. By example only, downstream processing operations such as auto-laterality routines for determining whether a retinal image is of a right eye or left eye, disease pipelines for automatic diagnosis of various ocular diseases or disorders, and data processing operations for automatically annotating retinal images (among others), can suffer/be detrimentally affected in cases where retinal landmark feature locations are not predicted accurately. Example systems, apparatuses, computer programs, and methods described herein, on the other hand, automatically detect inaccurate and/or unreliable predictions of landmark feature locations (e.g., such as those caused by occlusions in retinal images processed by the machine learning algorithms), to enable inaccurate predictions to be corrected and/or substantially avoided, thereby compensating for the occlusions, improving the accuracy of machine-learning predictions, and also improving the performance and results of the downstream processing operations. By virtue of the foregoing capabilities of the example aspects described herein, which are rooted in computer technology, the example aspects described herein therefore improve computers and computer processing/functionality, and also improve the field(s) of at least retinal image processing, and data processing, and also alleviate and/or substantially avoid extra computer processing and memory requirements that would otherwise be required to perform downstream operations based on inaccurate landmark feature predictions.

In the foregoing description, example aspects are described with reference to several example embodiments. Accordingly, the specification should be regarded as illustrative, rather than restrictive. Similarly, the figures illustrated in the drawings, which highlight the functionality and advantages of the example embodiments, are presented for example purposes only. The architecture of the example embodiments is sufficiently flexible and configurable, such that it may be utilized in ways other than those shown in the accompanying figures.

Software embodiments of the examples presented herein may be provided as, a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the example embodiments described herein. Such software may include without limitation device drivers, operating systems, and user applications. Ultimately, such computer-readable media or storage device(s) further include software for performing example aspects of the invention, as described above.

Included in the programming and/or software of the system are software modules for implementing the procedures described herein. In some example embodiments herein, a module includes software, although in other example embodiments herein, a module includes hardware, or a combination of hardware and software.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that any procedures recited in the claims need not be performed in the order presented.

While this specification contains many specific embodiment details, these should not be construed as limitations on the scope of any inventions or of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments and embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements and features discussed only in connection with one embodiment are not intended to be excluded from a similar role in other embodiments or embodiments.

The apparatuses described herein may be embodied in other specific forms without departing from the characteristics thereof. The foregoing embodiments are illustrative rather than limiting of the described systems and methods. Scope of the apparatuses described herein is thus indicated by the appended claims, rather than the foregoing description, and changes that come within the meaning and range of equivalence of the claims are embraced therein.

The invention claimed is:

1. An ocular imaging system for acquiring a retinal image of at least a portion of a retina of an eye, comprising:
   an image acquisition module configured to acquire the retinal image;
   a landmark location prediction module configured to use a machine learning algorithm to predict, as predicted locations of landmark features in the retinal image, a first location of a first landmark feature in the retinal image and a second location of a second landmark feature in the retinal image; and
   an apparatus for alerting a user of the ocular imaging system to an unreliability in at least one of the predicted locations of the landmark features, the apparatus comprising:
   a receiver module configured to receive the predicted locations of the landmark features;
   a distance metric evaluation module configured to use the predicted locations of the landmark features to evaluate a distance metric which is indicative of a distance between the first landmark feature and the second landmark feature;
   an outlier detector module configured to determine, using data indicative of a probability distribution of a distance between the first landmark feature and the second landmark feature obtained from measurements of the distance in a set of retinal images different from the retinal image, an indication of whether the evaluated distance metric lies outside a predetermined interval of the probability distribution which includes a peak of the probability distribution; and
   an alert generator module configured to generate an alert indicating that at least one of the predicted locations of the landmark features in the retinal image is unreliable in a case where the determined indication indicates that the evaluated distance metric lies outside the predetermined interval of the probability distribution.

2. The ocular imaging system according to claim 1, wherein
   the distance metric comprises one of a Euclidean distance and a Manhattan distance between the first landmark feature and the second landmark feature, and
   the outlier detector module is configured to use the data indicative of a probability distribution of the one of the Euclidean distance and the Manhattan distance between the first landmark feature and the second landmark feature obtained from measurements of the one of the Euclidean distance and the Manhattan distance in a set of retinal images different from the retinal image to determine the indication of whether the evaluated distance metric lies outside the predetermined interval of the probability distribution.

3. The ocular imaging system according to claim 1, wherein the distance metric comprises a weighted distance between the first landmark feature and the second landmark feature, the weighted distance being a product of the distance between the first landmark feature and the second landmark feature and a weighting factor whose value increases with increasing absolute values of a difference between the distance and a value of the distance corresponding to the peak of the probability distribution.

4. The ocular imaging system according to claim 1, wherein
   the distance metric evaluation module is further configured to use the predicted first location to evaluate a second distance metric which is indicative of a second distance being a distance between the predicted first location and a reference location,
   the outlier detector module is further configured to determine, using data indicative of a second probability distribution of a distance between the first landmark feature and the reference location, which second probability distribution is based on measurements of the distance between the first landmark feature and the reference location in a set of retinal images different from the retinal image, a second indication being an indication of whether the evaluated second distance metric lies outside a predetermined interval of the second probability distribution which includes a peak of the second probability distribution, and
   the alert generator module is configured to generate, as the alert, an alert indicating that the first predicted location in the retinal image is unreliable in a case where the determined second indication indicates that the evaluated second distance metric does not lie within the predetermined interval of the second probability distribution.

5. The ocular imaging system according to claim 1, wherein
   the landmark location prediction module is further configured to use the machine learning algorithm to classify the retinal image as belonging to one of a plurality of predetermined different classes, based on the predicted locations of the landmark features in the retinal image, and
   the alert generator module is further configured to generate, as the alert, an alert further indicating that the classification of the retinal image by the machine learning algorithm is unreliable.

6. The ocular imaging system according to claim 5, wherein the landmark location prediction module is configured to classify the retinal image as belonging the one of the plurality of predetermined different classes by classifying the retinal image as being a retinal image of either a left eye or a right eye of a subject.

7. The ocular imaging system according to claim 1, wherein the first landmark feature is a fovea in the retinal image and the second landmark feature is an optic disc in the retinal image.

8. An apparatus for processing, as predicted locations of landmark features in a retinal image of at least a portion of a retina of an eye, a first location of a first landmark feature in the retinal image and a second location of a second landmark feature in the retinal image that have been predicted by a machine learning algorithm, to alert a user of the apparatus to an unreliability in at least one of the predicted locations of the landmark features, the apparatus comprising:
  a receiver module configured to receive the predicted locations of the landmark features;
  a distance metric evaluation module configured to use the predicted locations of the landmark features to evaluate a distance metric which is indicative of a distance between the first landmark feature and the second landmark feature;
  an outlier detector module configured to determine, using data indicative of a probability distribution of a distance between the first landmark feature and the second landmark feature obtained from measurements of the distance in a set of retinal images different from the retinal image, an indication of whether the evaluated distance metric lies outside a predetermined interval of the probability distribution which includes a peak of the probability distribution; and
  an alert generator module configured to generate an alert indicating that at least one of the predicted locations of the landmark features in the retinal image is unreliable in a case where the determined indication indicates that the evaluated distance metric lies outside the predetermined interval of the probability distribution.

9. A non-transitory computer-readable storage medium comprising computer program instructions which, when executed by at least one computer processor, cause the at least one computer processor to perform a method of processing, as predicted locations of landmark features in a retinal image of at least a portion of a retina of an eye, a first location of a first landmark feature in the retinal image and a second location of a second landmark feature in the retinal image that have been predicted by a machine learning algorithm, to alert a user of the apparatus to an unreliability in at least one of the predicted locations of the landmark features, the method comprising:
  receiving the predicted locations of the landmark features;
  using the predicted locations of the landmark features to evaluate a distance metric which is indicative of a distance between the first landmark feature and the second landmark feature;
  determining, using data indicative of a probability distribution of a distance between the first landmark feature and the second landmark feature obtained from measurements of the distance between the first landmark feature and the second landmark feature in retinal images different from the retinal image, an indication of whether the evaluated distance metric lies outside a predetermined interval of the probability distribution which includes a peak of the probability distribution; and
  generating an alert indicating that the at least one of the predicted locations of the landmark features in the retinal image is unreliable, in a case where the determined indication indicates that the evaluated distance metric lies outside the predetermined interval of the probability distribution.

10. The non-transitory computer-readable storage medium according to claim 9, wherein
  the distance metric comprises one of a Euclidean distance and a Manhattan distance between the first landmark feature and the second landmark feature, and
  data indicative of a probability distribution of the one of the Euclidean distance and the Manhattan distance the between the first landmark feature and the second landmark feature obtained from measurements of the one of the Euclidean distance and the Manhattan distance in a set of retinal images different from the retinal image, is used to determine the indication of whether the evaluated distance metric lies outside the predetermined interval of the probability distribution.

11. The non-transitory computer-readable storage medium according to claim 9, wherein the distance metric comprises a weighted distance between the first landmark feature and the second landmark feature, the weighted distance being a product of the distance between the first landmark feature and the second landmark feature and a weighting factor whose value increases with increasing absolute values of a difference between the distance between the first landmark feature and the second landmark feature and a value of the distance corresponding to the peak of the probability distribution.

12. The non-transitory computer-readable storage medium according to claim 9, wherein the method further comprises:
  using the predicted first location to evaluate a second distance metric which is indicative of a second distance between the predicted first location and a reference location of the first landmark feature;
  determining, using data indicative of a second probability distribution of a distance between the first landmark feature and the reference location, which second probability distribution is based on measurements of the distance between the first landmark feature and the reference location in retinal images different from the retinal image, a second indication being an indication of whether the evaluated second distance metric lies outside a predetermined interval of the second probability distribution which includes a peak of the second probability distribution; and
  generating, as the alert, an alert indicating that the first predicted location in the retinal image is unreliable in a case where the determined second indication indicates that the evaluated second distance metric lies outside the predetermined interval of the second probability distribution.

13. The non-transitory computer-readable storage medium according to claim 9, wherein the method further comprises:
  using the machine learning algorithm to predict the first location of the first landmark feature in the retinal image and the second location of the second landmark feature in the retinal image.

14. The non-transitory computer-readable storage medium according to claim 13, wherein
  the machine learning algorithm further classifies the retinal image as belonging to one of a plurality of predetermined different classes, based on the predicted locations of the landmark features in the retinal image), and the method comprises generating, as the alert, an alert further indicating that the classification of the retinal image by the machine learning algorithm is unreliable.

15. The non-transitory computer-readable storage medium according to claim 14, wherein classifying the retinal image as belonging the one of the plurality of predetermined different classes comprises classifying the retinal image as being a retinal image of either a left eye or a right eye of a subject.

16. The non-transitory computer-readable storage medium according to claim 9, wherein the first landmark feature is a fovea in the retinal image and the second landmark feature is an optic disc in the retinal image.

17. The non-transitory computer-readable storage medium according to claim 9, wherein the machine learning algorithm comprises a convolutional neural network configured to predict the locations of the landmark features in the retinal image.

\* \* \* \* \*